Oct. 17, 1967  A. G. FLINT ETAL  3,347,348
ARTICLE SINGULATING SYSTEM
Filed May 24, 1965  22 Sheets-Sheet 1

INVENTORS
ALAN G. FLINT
LASZLO SIPOS
THOMAS GUTIERREZ
BY *Hans G. Hoffmeister*
ATTORNEY

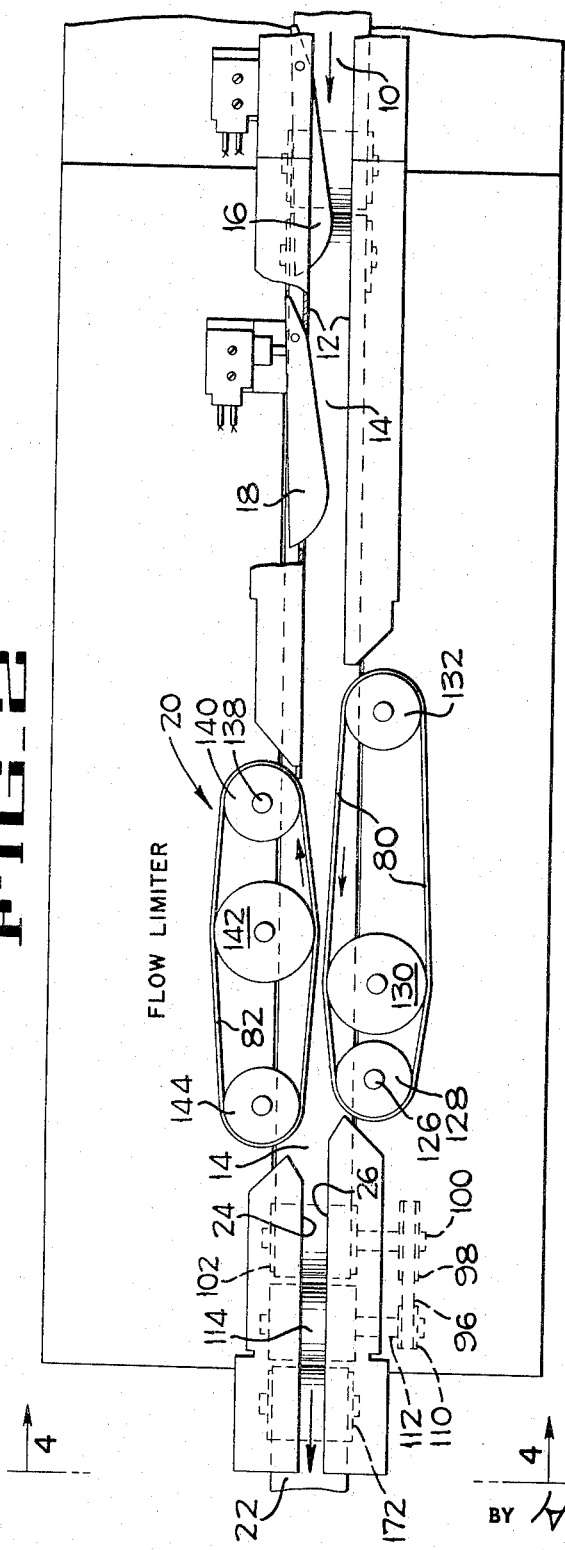

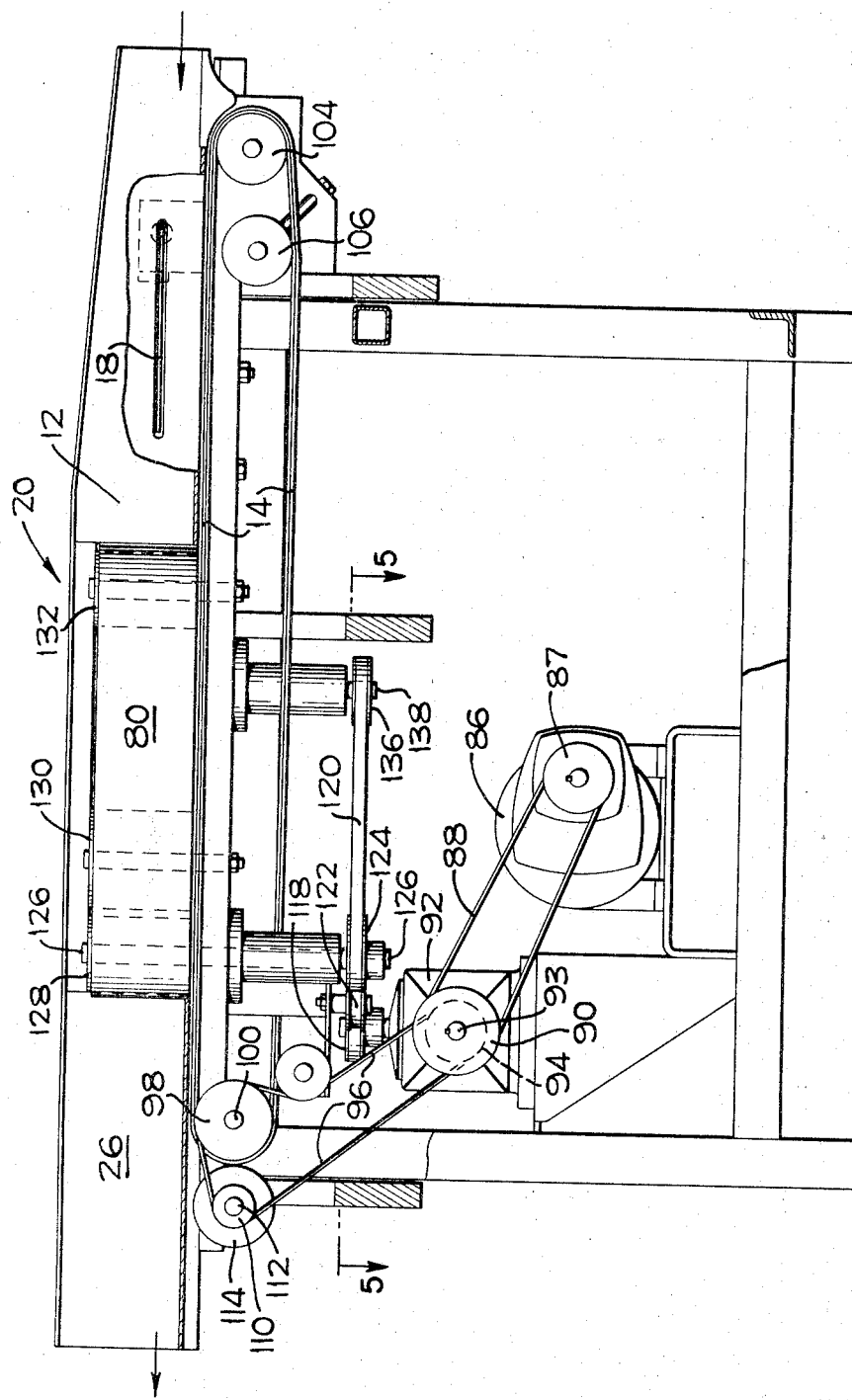

Oct. 17, 1967  A. G. FLINT ETAL  3,347,348
ARTICLE SINGULATING SYSTEM
Filed May 24, 1965  22 Sheets-Sheet 4
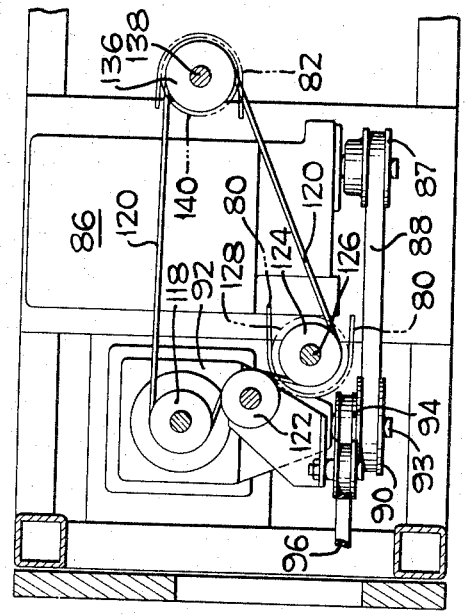
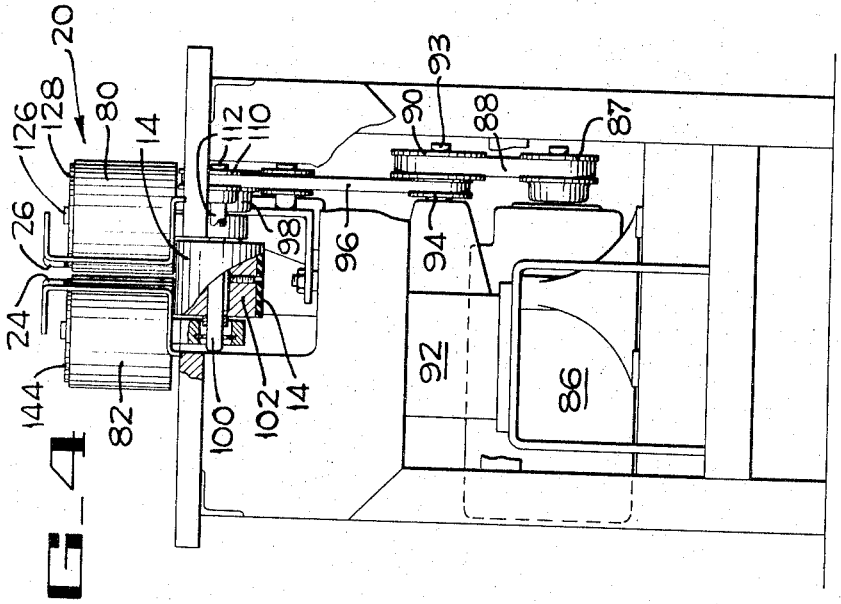
INVENTORS
ALAN G. FLINT
LASZLO SIPOS
THOMAS GUTIERREZ
BY Hans F. Hoffmeister.
ATTORNEY

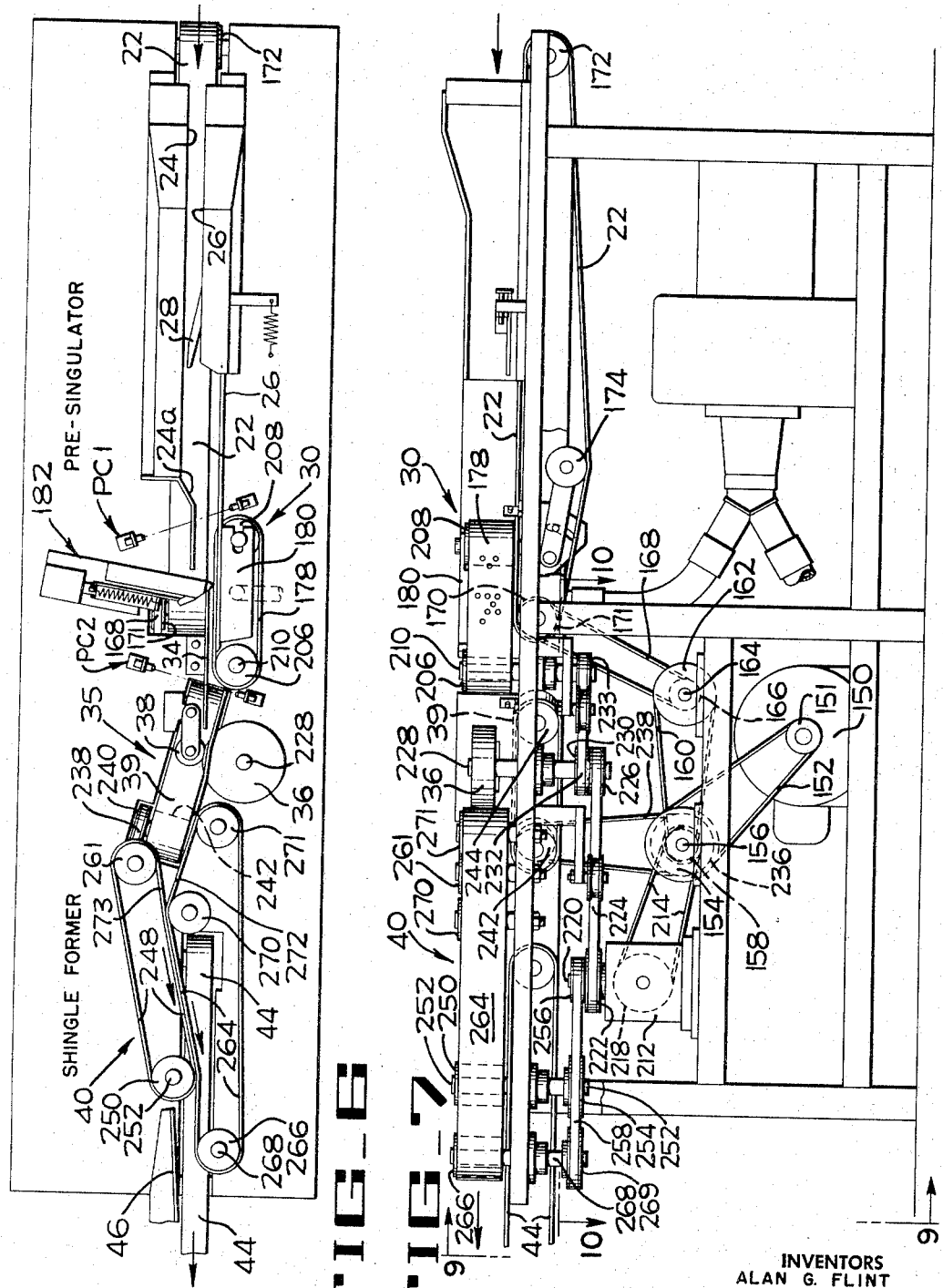

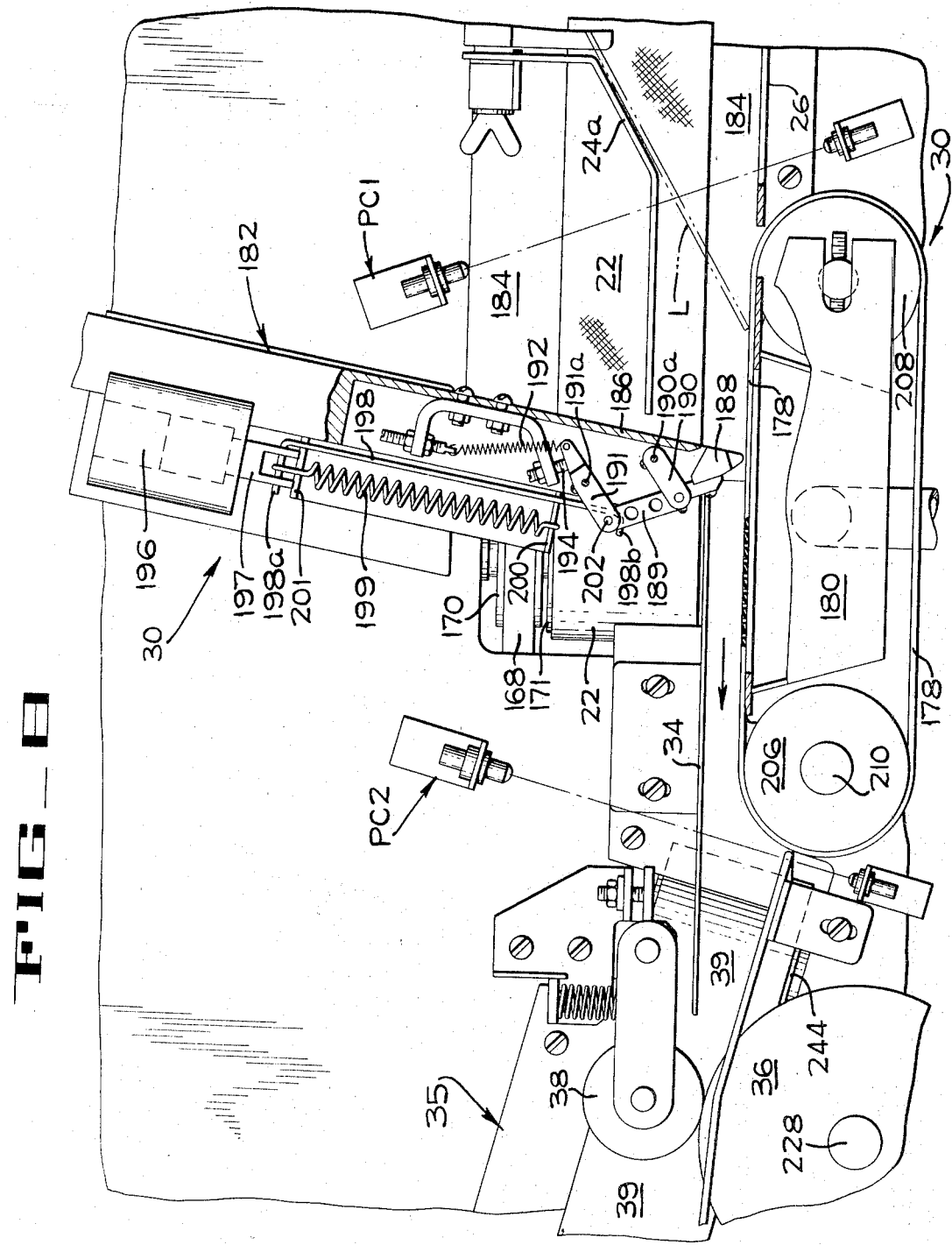

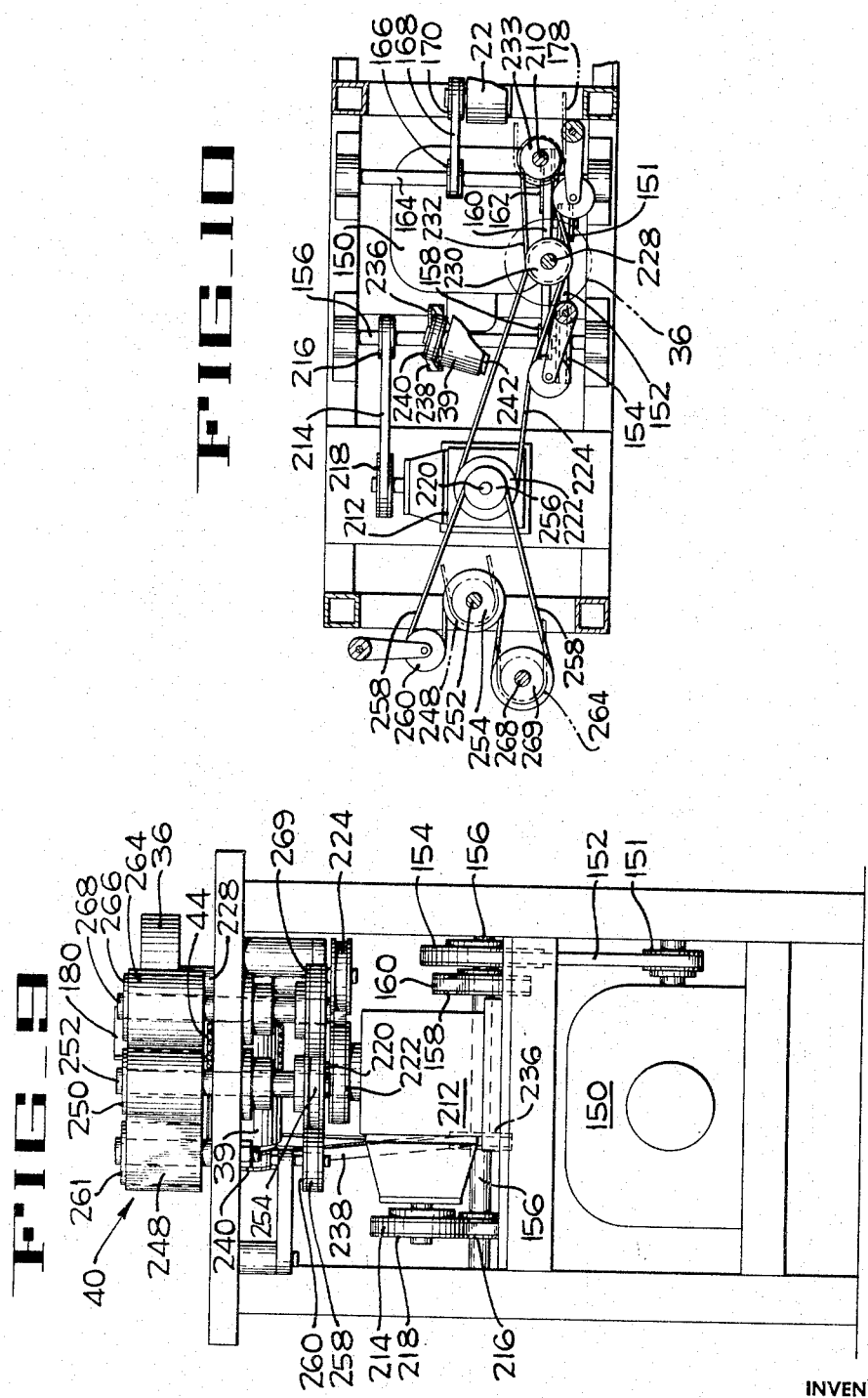

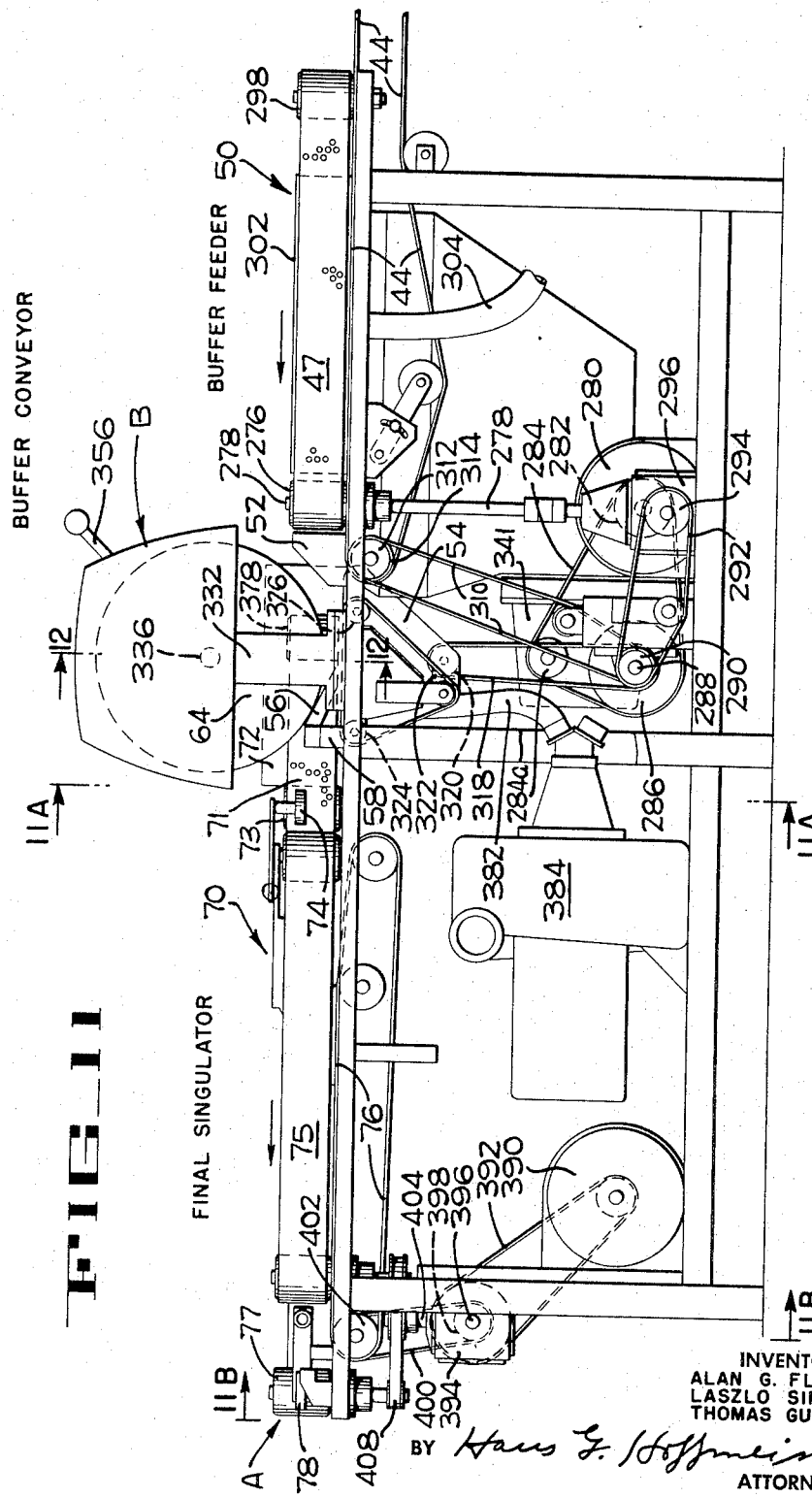

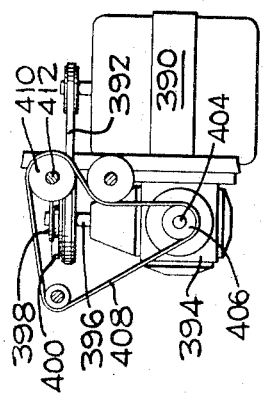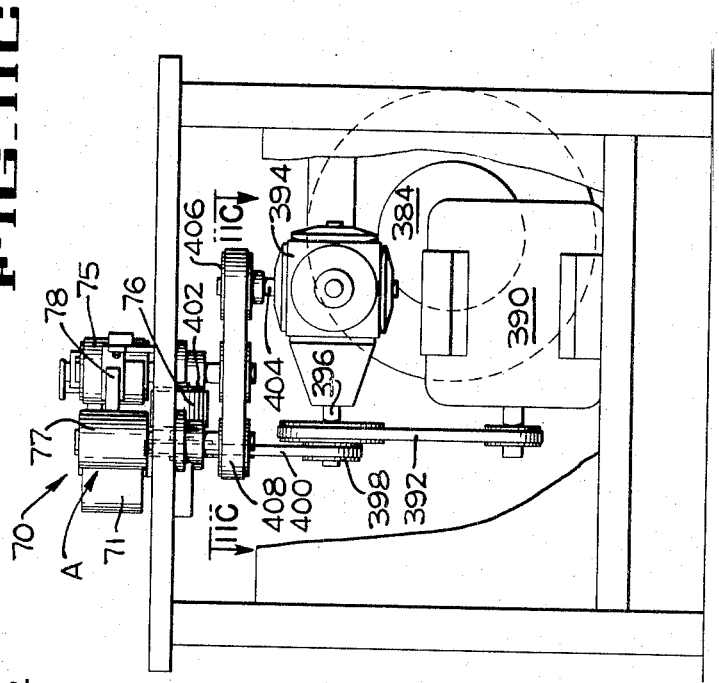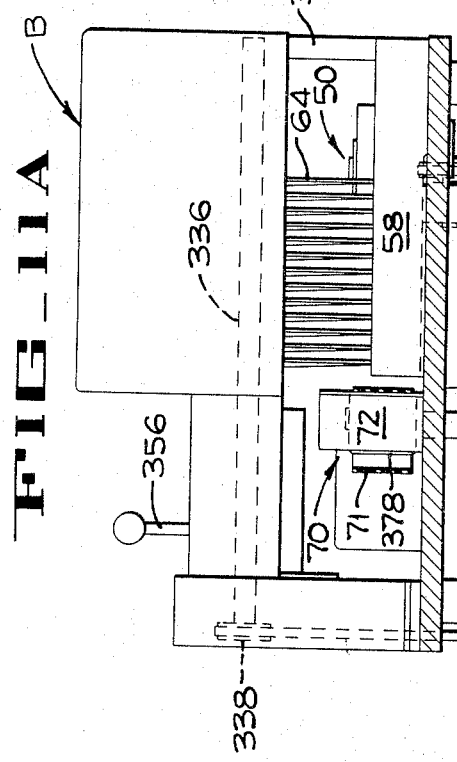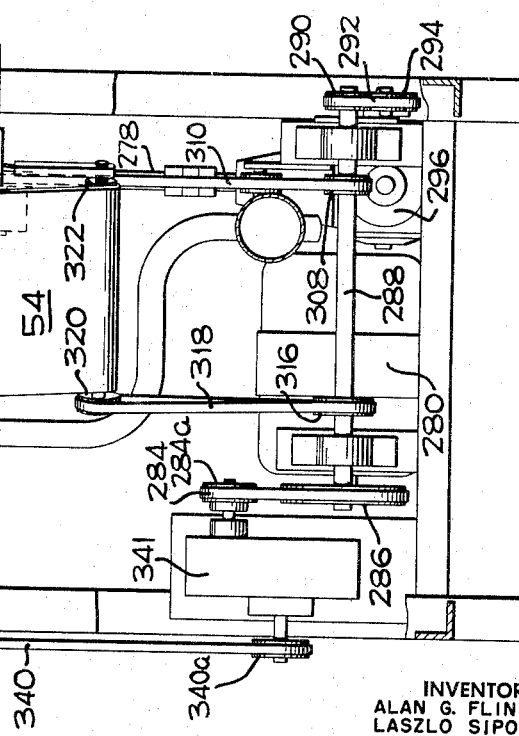

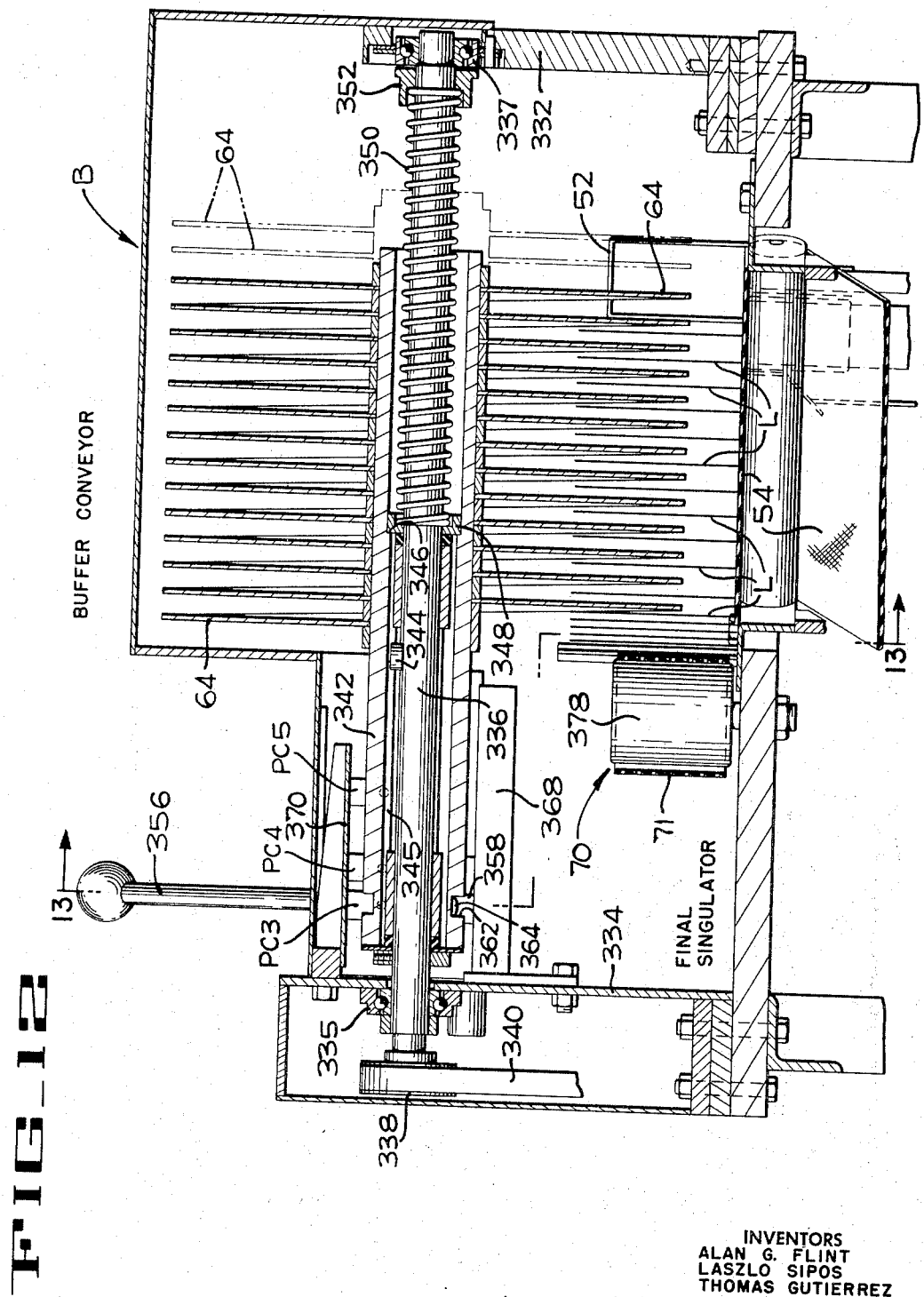

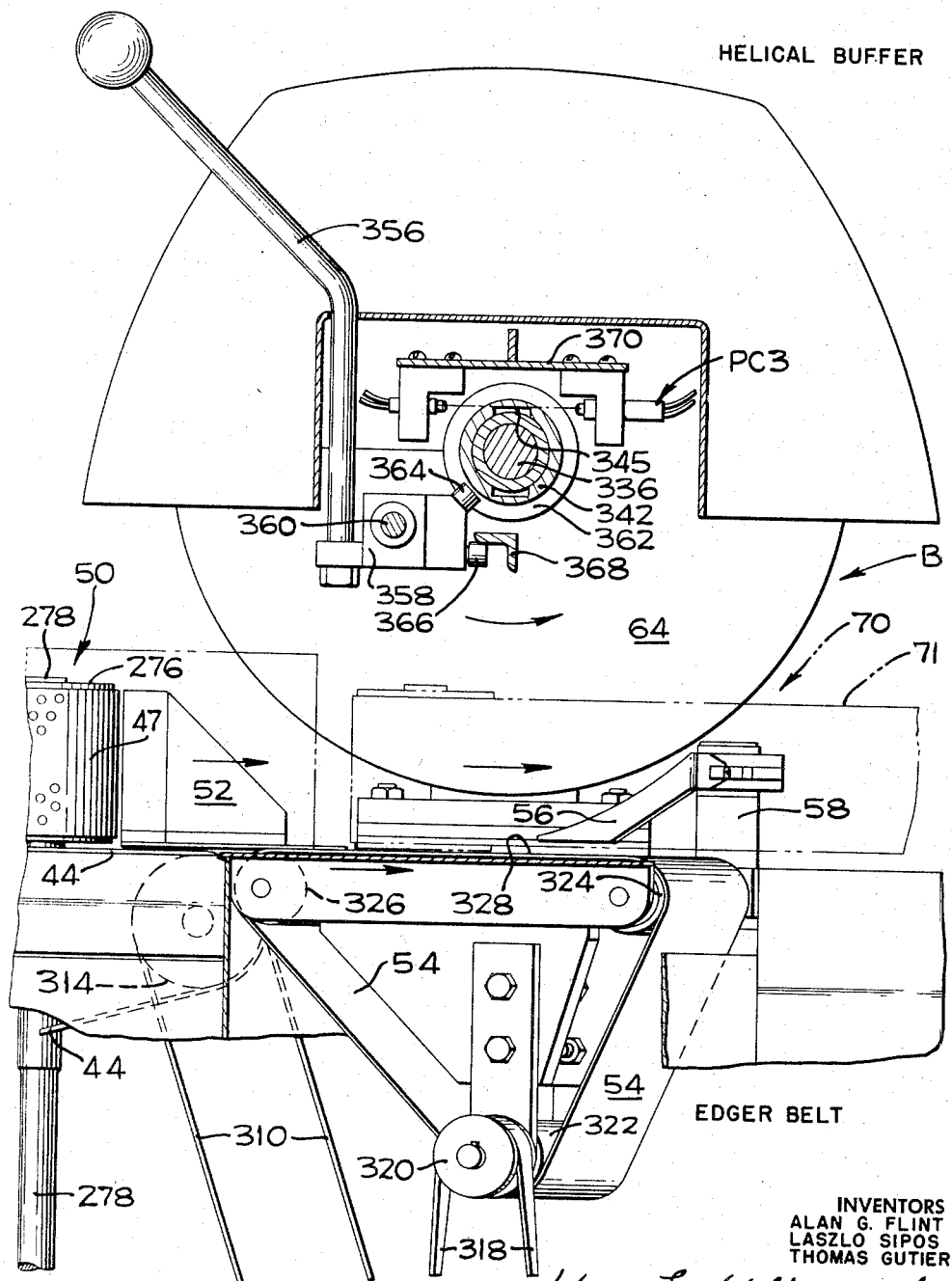

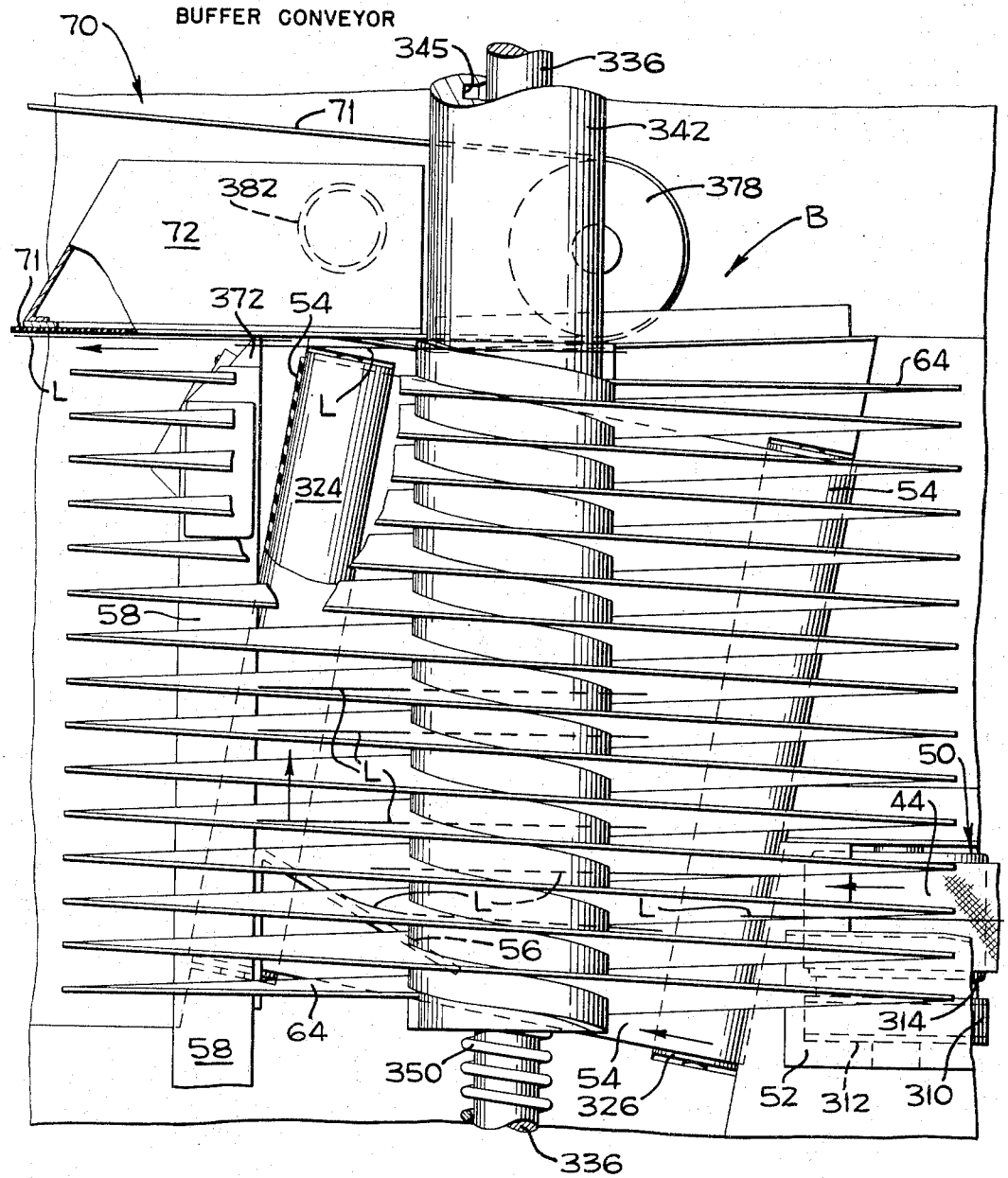
FIG_14

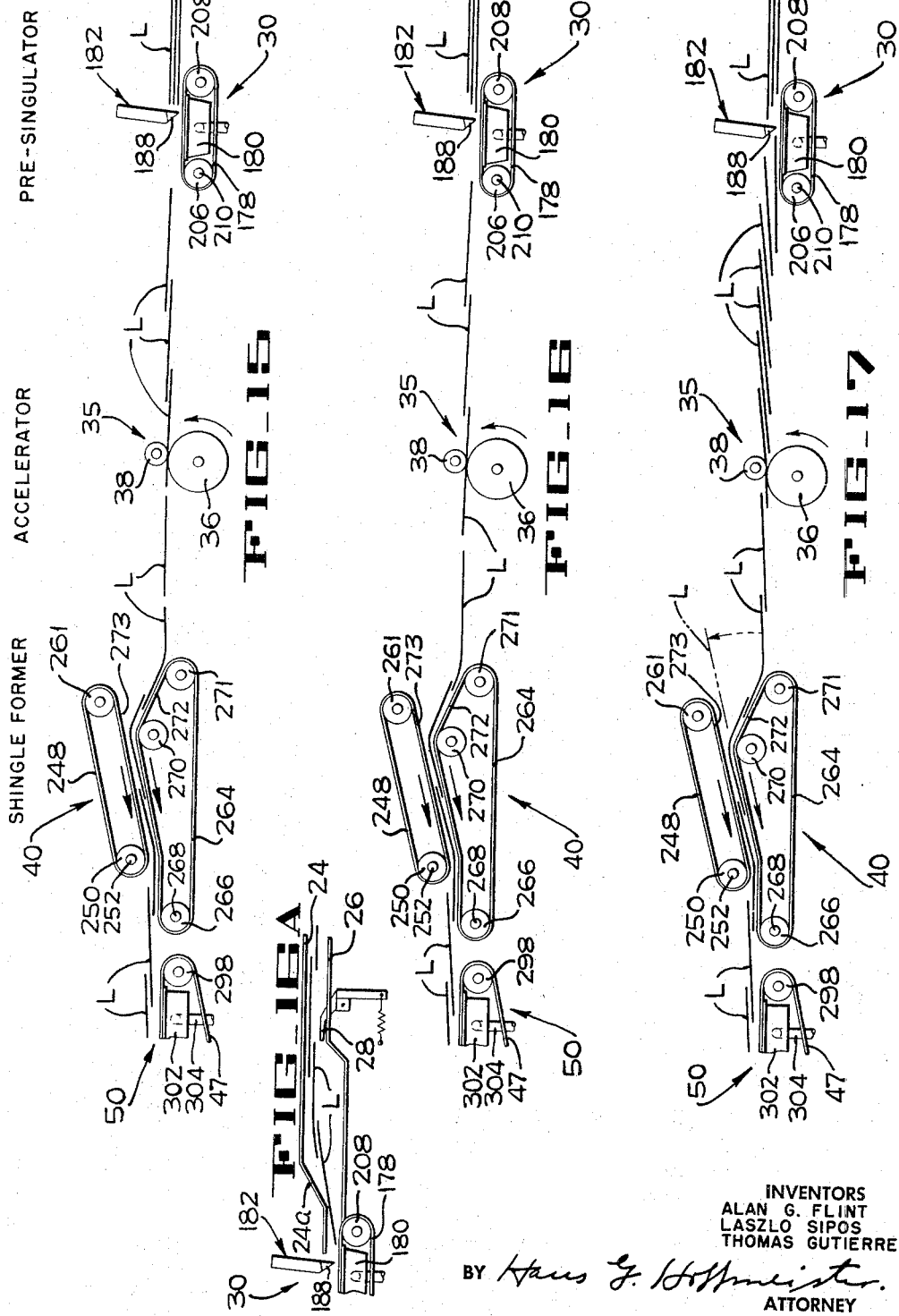

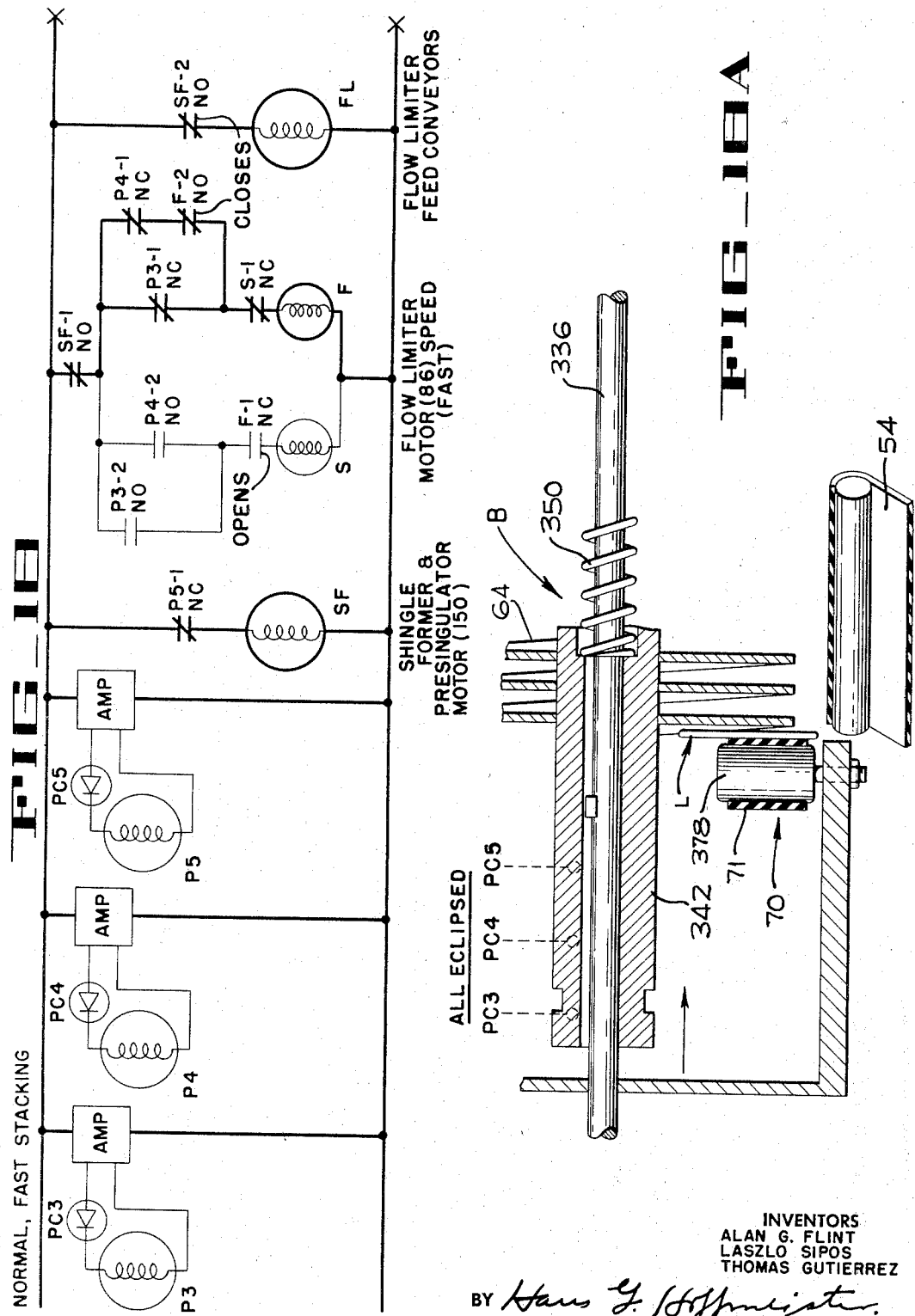

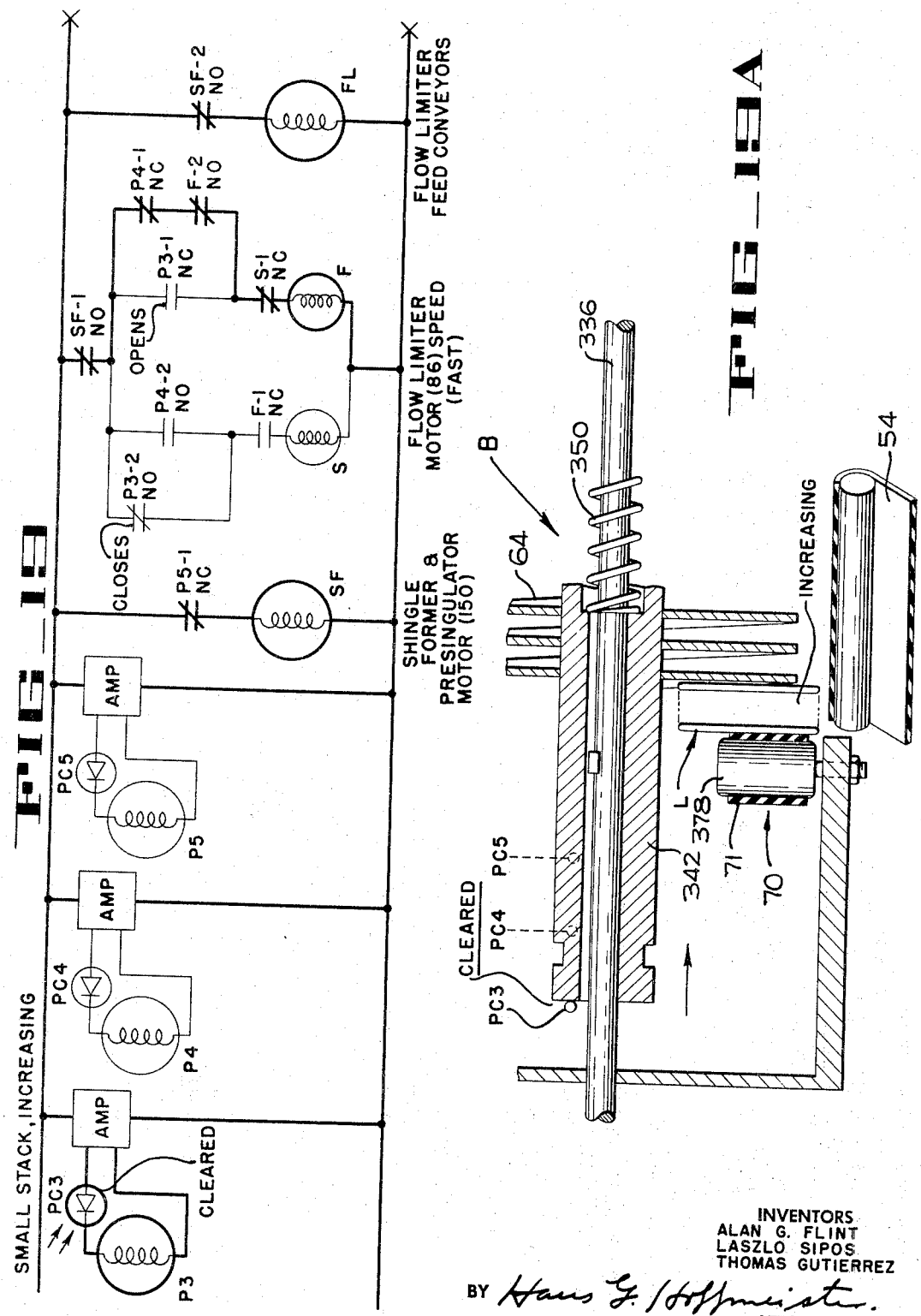

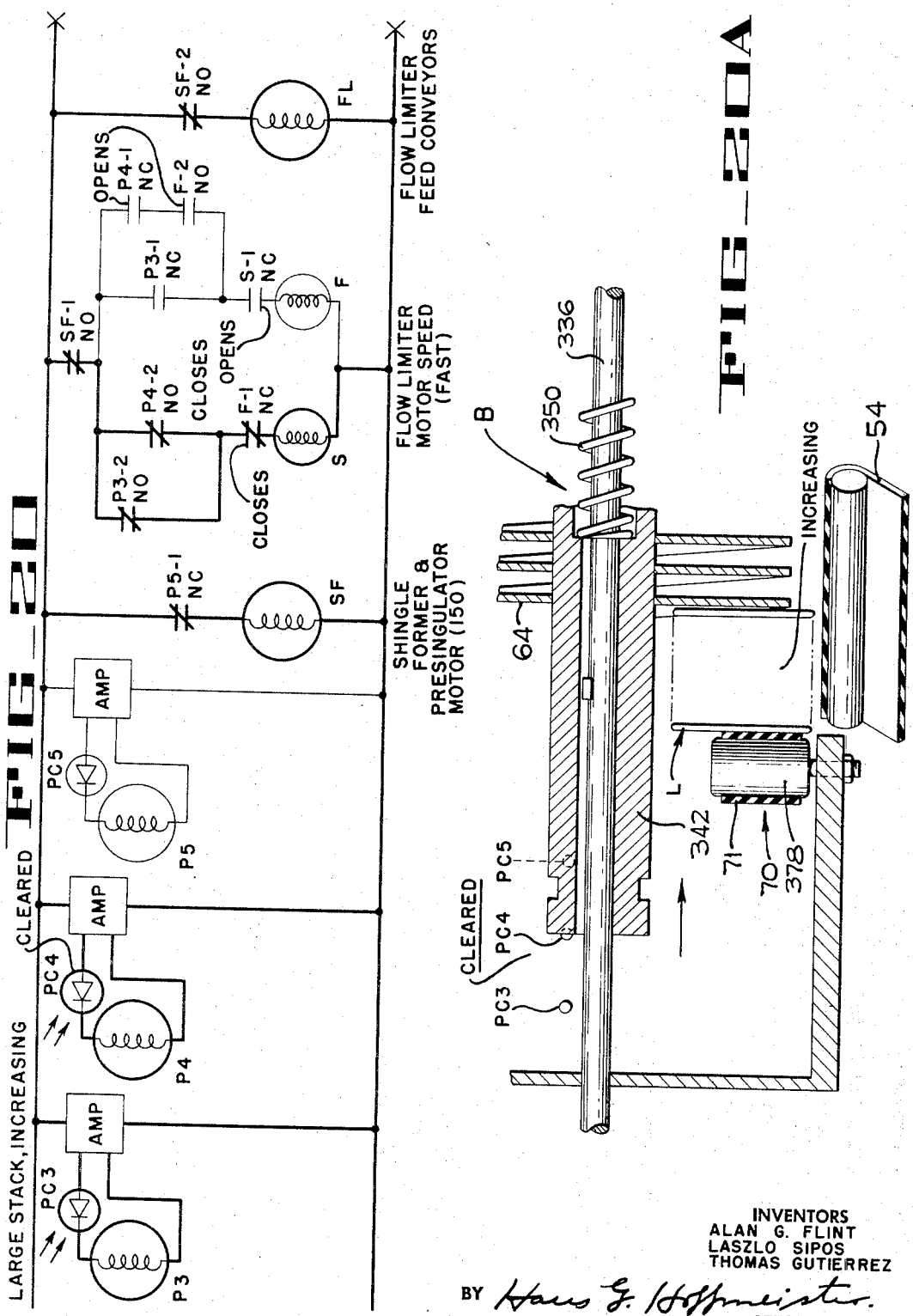

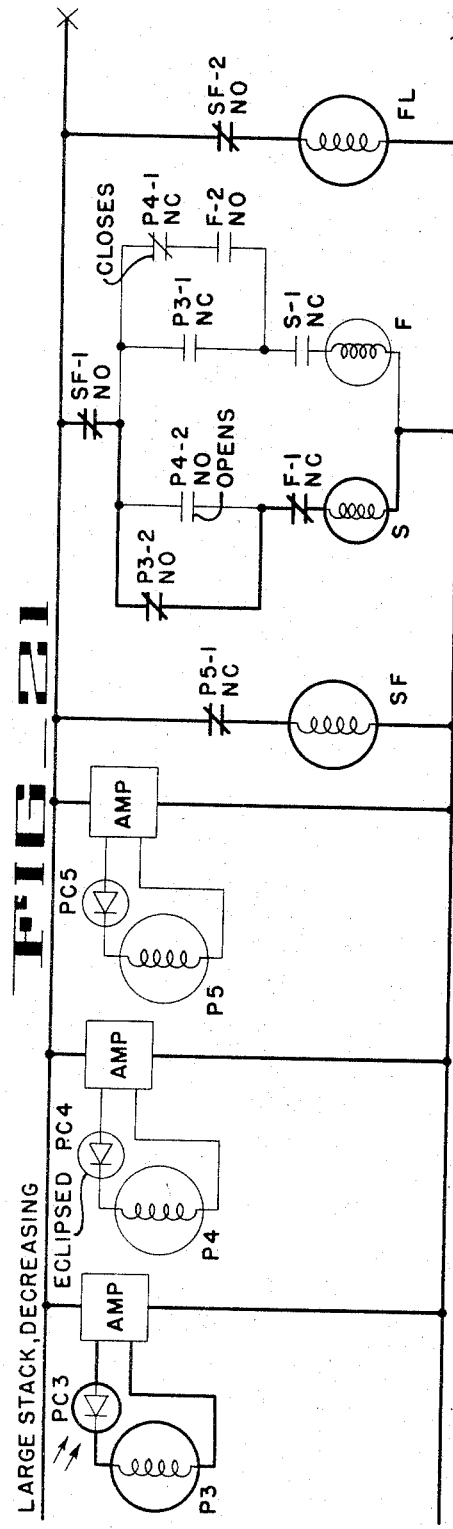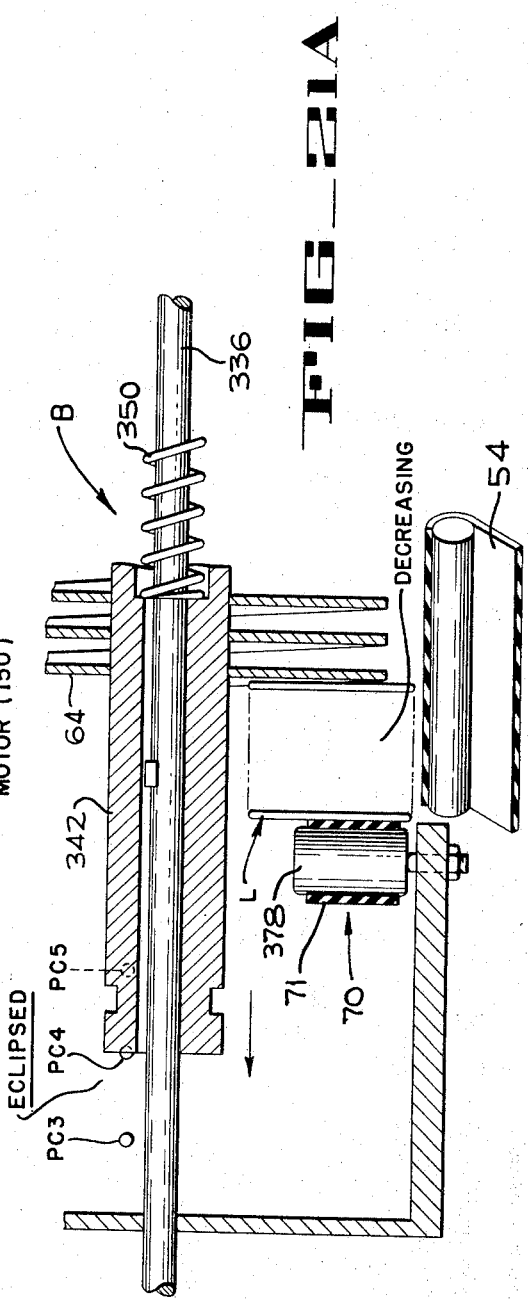

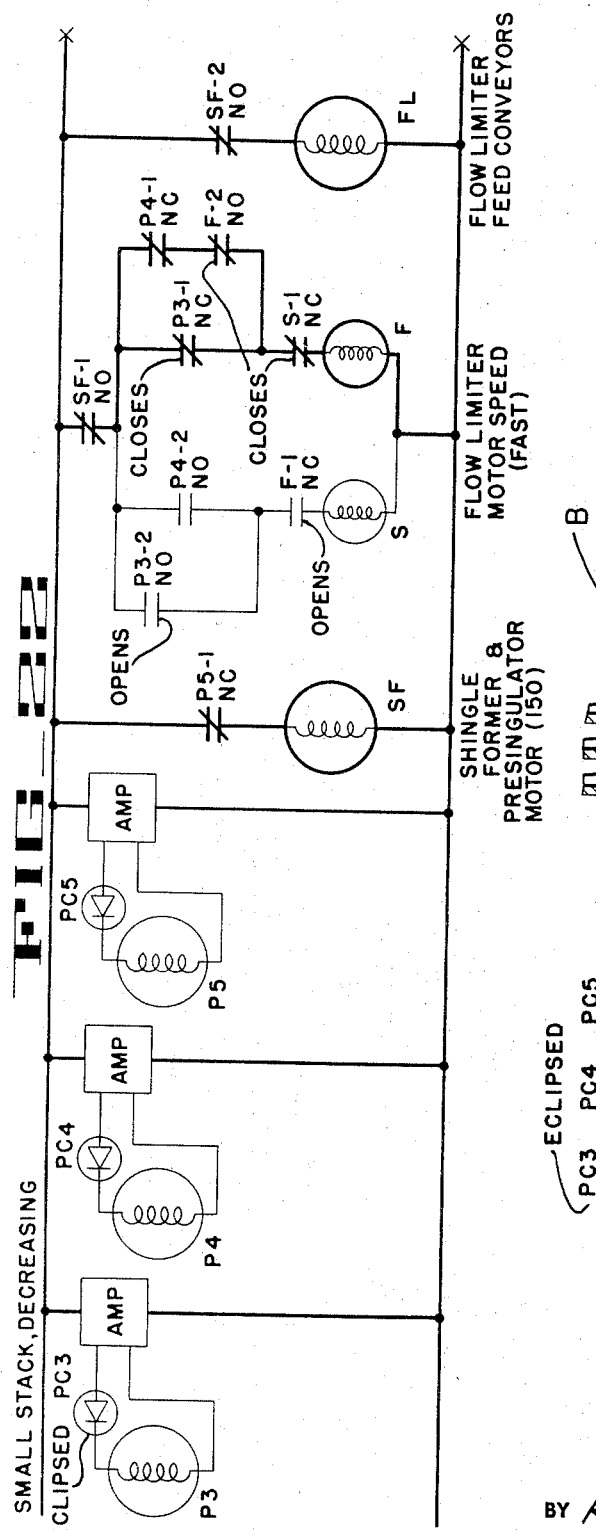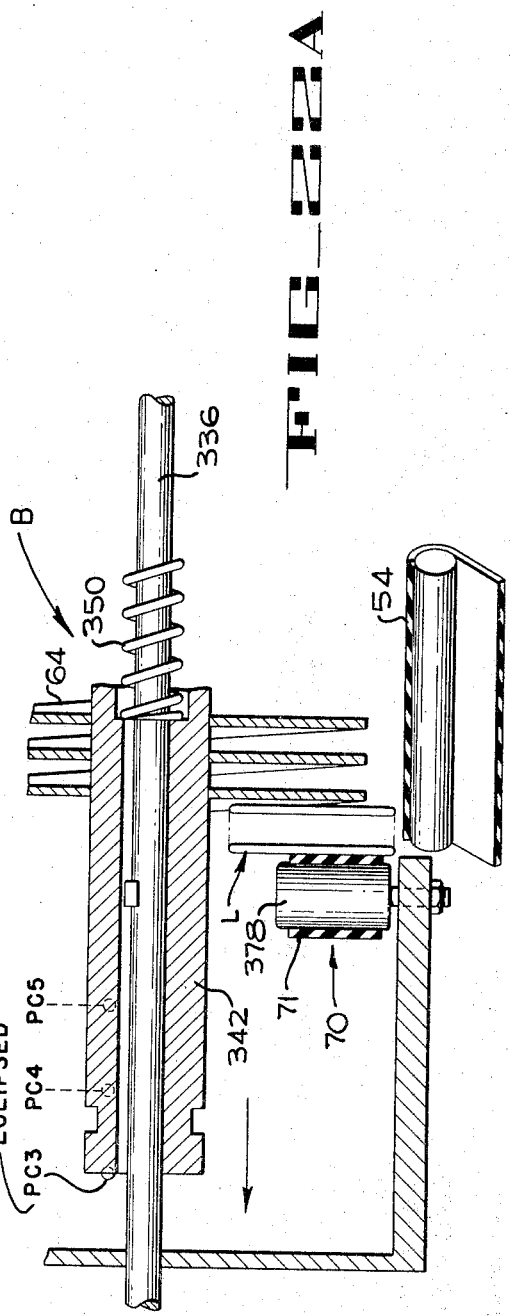

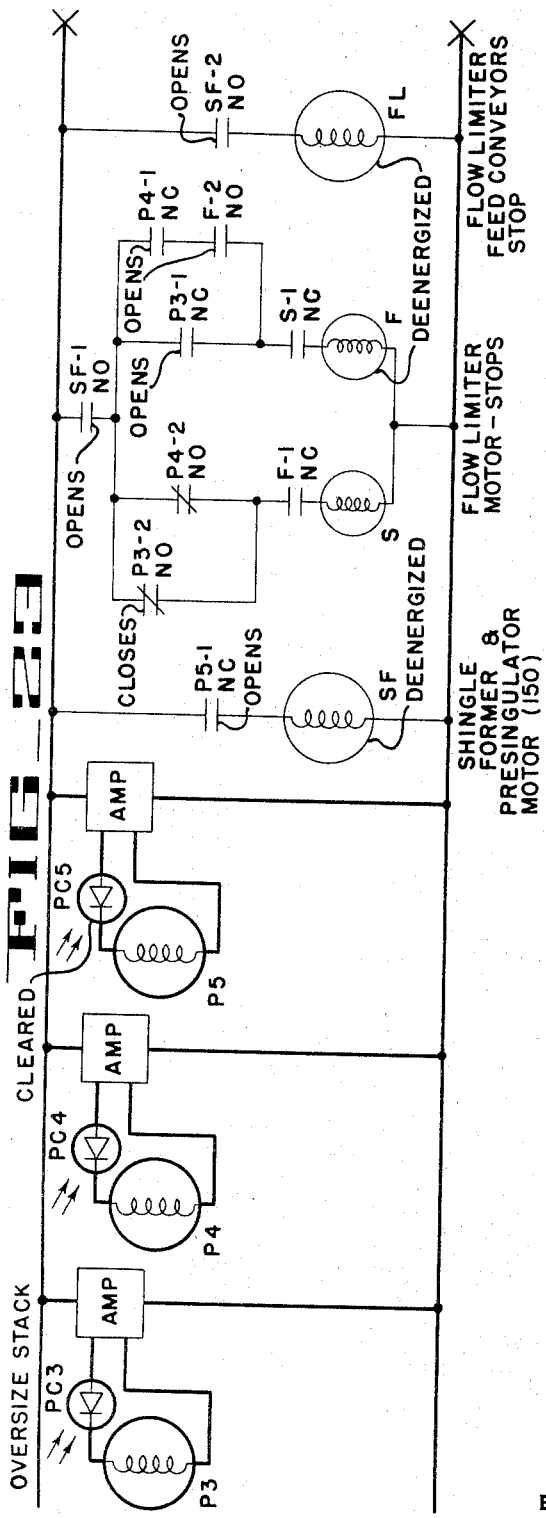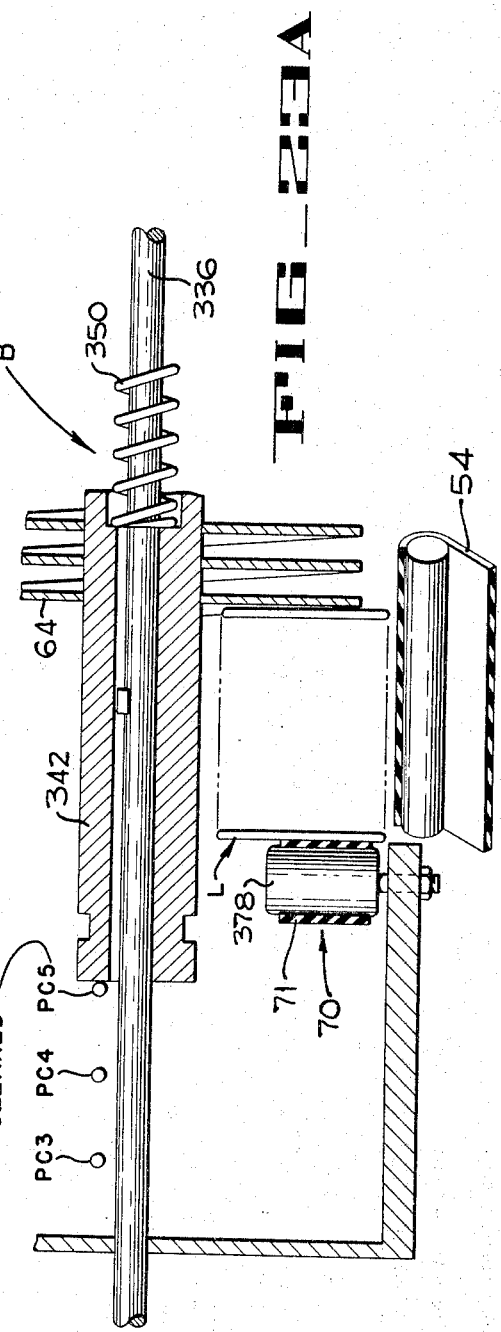

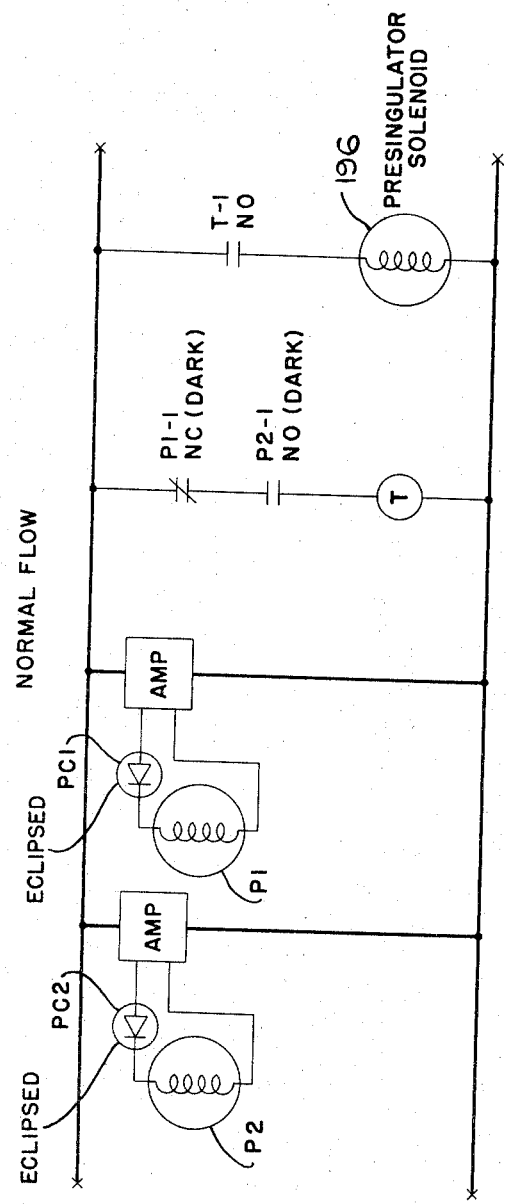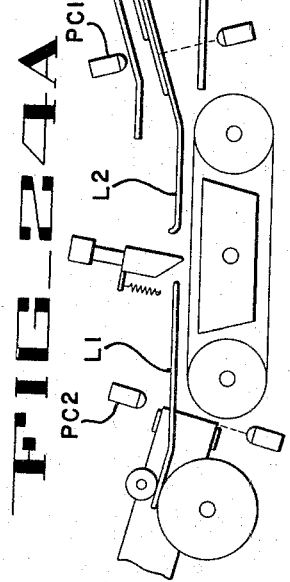

Oct. 17, 1967

A. G. FLINT ETAL 3,347,348

ARTICLE SINGULATING SYSTEM

Filed May 24, 1965

INVENTORS
ALAN G. FLINT
LASZLO SIPOS
THOMAS GUTIERREZ

BY *Hans G. Hoffmeister*

ATTORNEY

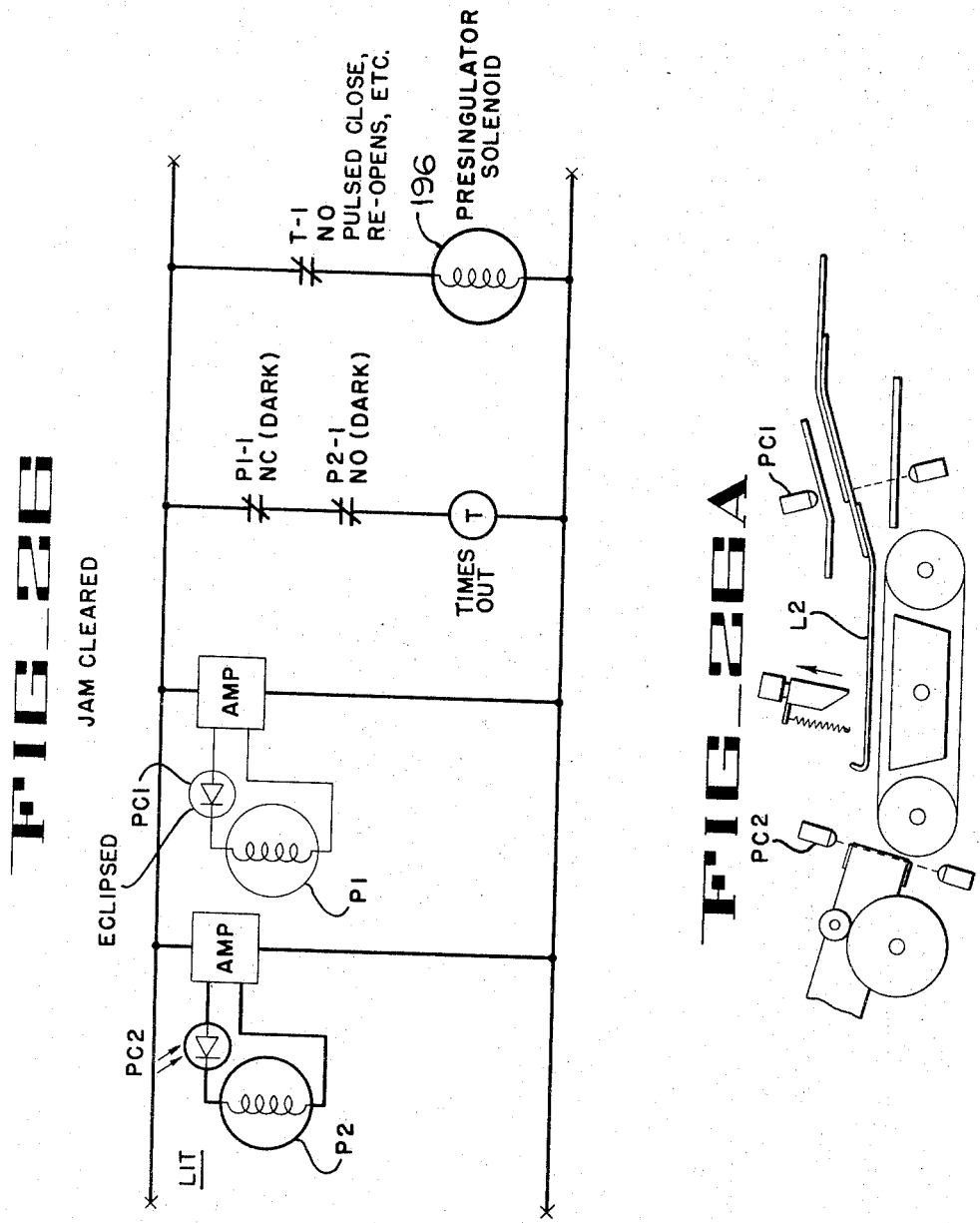

United States Patent Office 3,347,348
Patented Oct. 17, 1967

3,347,348
ARTICLE SINGULATING SYSTEM
Alan George Flint and Laszlo Sipos, San Jose, and Thomas Gutierrez, Santa Clara, Calif., assignors to FMC Corporation, San Jose, Calif. a corporation of Delaware
Filed May 24, 1965, Ser. No. 458,265
14 Claims. (Cl. 198—30)

This invention relates to material handling and more particularly to the handling of thin, flat articles such as letter mail, punch cards, etc. The apparatus of this invention to be described is an embodiment of the invention designed to handle articles such as letter mail, with a high throughput, and without damage to the letters.

More specifically, the apparatus of the present invention forms part of an automatic mail handling system. In the system to be described letter mail having an average length of 7½ inches is supplied in random distribution, such as in bunches, or essentially continuous multi-thickness layers, etc. The system of the present invention accepts vertically standing bulk input mail as just described and passes through a series of orienting or pattern forming conveyors that arrange the letters in a pattern that is acceptable to a helical buffer storage conveyor. The helical buffer conveyor presents an edged stack of letters, up to five inches thick, to a final singulator conveyor which picks up the letters one by one from the stack of letters, at the helical buffer conveyor, and delivers the letters with a slight overlap to a letter accelerator. The accelerator gaps the letters, and delivers them to a take away conveyor, for presentation to a facer-canceller, scale platform, or other device, in a singulated and gapped condition.

It is an object of the present invention to receive bulk mail at a high volume (such as 30,000 letters per hour), distribute and orient the mail, and present it to a final singulator conveyor as an edged stack. The letters are now moving continuously and uniformly, regardless of random variations in the input patterns to the system of the present invention.

Another object of the present invention is to present mail at a high volume to a helical buffer conveyor unit which forms clean edged stacks of mail, without damage to the mail.

Another object is to provide means for receiving bulk mail as described, and shingling the mail into a lapped form that permits the helical buffer conveyor referred to to pick up letters while maintaining them in a vertical condition.

Another object of the invention is to provide a system of the type described which prevents jamming and damage to the mail in case of excessive input loads, and which renders uniform the stream of mail obtained from the random bulk input of mail at the input end of the system.

Another object of the invention is to provide a system of the type described which operates continuously, and includes a flow limiter conveyor for smoothing out excess inputs of mail, without creating voids in the stream of mail.

Another object of the invention is to insure that the system will handle randomly introduced bulk mail without causing jams or clogging of the system.

The manner in which these and other objects of the invention may be accomplished will be apparent from the following detailed description of the invention as employed in the handling of documents such as letter mail.

In the drawings:

FIGURES 1, 1A, and 1B form a composite diagrammatic plan of the system of the present invention, starting with the mail receiving portion of the system, and ending with the unit that supplies a stream of singulated mail to a processing unit such as a facer-canceller, scale or the like (not shown).

FIGURE 2 is an enlarged plan of the flow limiter.

FIGURE 2A is a diagram showing the typical arrangement of bulk mail that may be presented to the flow limiter.

FIGURE 2B is a diagram showing the typical arrangement of a stream of mail leaving the flow limiter.

FIGURE 3 is a side elevation of the flow limiter.

FIGURE 4 is an end elevation of the flow limiter taken on lines 4—4 of FIG. 2.

FIGURE 5 is a horizontal section showing the drive of the flow limiter, taken on lines 5—5 of FIG. 3.

FIGURE 6 is a somewhat enlarged plan of the pre-singulator and shingle former.

FIGURE 7 is a side elevation of the pre-singulator and shingle former.

FIGURE 8 is an enlarged partially sectioned plan of the pre-singulator.

FIGURE 9 is an end elevation of the shingle former, taken on lines 9—9 of FIG. 7.

FIGURE 10 is a section showing the drive for the shingle former conveyor, taken on lines 10—10 of FIG. 9.

FIGURE 11 is a side elevation of the apparatus at the helical buffer.

FIGURE 11A is a section taken on lines 11A—11A of FIG. 11, showing buffer feeder conveyor and buffer conveyor drive elements.

FIGURE 11B is a section taken on lines 11B—11B of FIG. 11 showing the final singulator conveyor drive.

FIGURE 11C is a section taken on lines 11C—11C of FIG. 11B.

FIGURE 12 is a vertical section through the helical buffer conveyor taken on lines 12—12 of FIG. 11.

FIGURE 13 is a section through the helical buffer conveyor, taken on lines 13—13 of FIG. 12.

FIGURE 14 is a fragmentary enlarged plan of the helical buffer conveyor.

FIGURE 15 is a diagram showing the operation of the pre-singulator conveyor, when receiving edged mail.

FIGURE 16 is a similar diagram, showing mail presented to the pre-singulator conveyor that is lapped in a manner not acceptable to the helical buffer conveyor.

FIGURE 16A is a plan of the pre-singulator conveyor like that of FIG. 1A, but on a larger scale.

FIGURE 17 is a similar diagram showing the effect when lapped mail is supplied to the pre-singulator conveyor, with the mail being lapped in the correct condition for eventual pick-up by the helical buffer conveyor.

FIGURE 18 is a schematic of of the helical buffer conveyor control circuit.

FIGURE 18A is a diagram showing the physical condition of the helical buffer conveyor relative to the circuit elements shown in FIG. 18.

FIGURES 19, 19A to 23, 23A are diagrams corresponding to FIGURES 18 and 18A, showing the active circuits at various critical points in the operation of the helical buffer conveyor.

FIGURES 24, 24A to 26, 26A are diagrams similar to those of FIGURES 18, 18A showing an operation of the control circuits for the pre-singulator conveyor.

GENERAL DESCRIPTION

The general description of the entire letter handling system of the present invention will be described primarily in connection with FIGURES 1, 1A and 1B, which when connected illustrate a complete system of the present invention, and the schematic diagram of FIGS. 15–17.

The system of the present invention converts a continuous, random, non-uniform stream of letters, into a uniformly gapped stream of letters. This gapped stream of letters is received by a take away conveyor and delivered to a facer-canceller, weighing scale, or other device (not shown). Before briefly describing the apparatus shown in FIGURES 1 to 1B, it is to be understood that the apparatus receives articles such as letters, standing on their long edges, from an input feed conveyor 10. These letters arrive either singly, or in groups, or in mixed bunches, or in thick streams, but at an average relatively constant net rate of feed. In the example given, 30,000 letters per hour will be fed to the apparatus of the present invention by the input feed conveyor 10. The apparatus of the present invention insures complete singulation with a minimum 3″ gapping of the letters, and delivery of the singulated letters to a takeaway conveyor at an average flow rate corresponding to the input rate. The various components of the apparatus of the present invention accomplish this without damage, tearing, bending, etc. of the letters during the singulating operation.

The supply of letters entering the apparatus on the input feed conveyor belt 10 (FIG. 1) is assumed to have been screened in order to remove all over and under width letters. Such screening devices are known in the art, are not critical to the present invention, and therefore are not illustrated or described.

Incoming letters standing on their long edges on the horizontal plane input conveyor belt 10, are kept from falling over by guide rails 12 which also flank a horizontal plane transport belt conveyor 14 that forms a prolongation of the input conveyor 10, but which has a lower linear speed. The letters pass anti-jam switches 16, 18, which control an adjustable speed motor that drives the transport belt conveyor 10. If letters become jammed in the system, and pile up to close switches 18, or 18 and 16, these switches, by means not critical to the present invention, slow down the motor that drives the transport conveyor belt 10 at its lowest speed, thereby reducing the input to the downstream units of the system, so long as the jam persists.

The transport belt conveyor 14 carries the letters to a flow limiter conveyor 10 (FIG. 1), which comprises opposed vertical plane belts that leave a narrow gap through which letters entering the flow limiter are conducted, and the stream of letters is spread out. The linear speeds of the vertically disposed flow-limiter belts are higher than that of the transport conveyor 14.

Letters leaving the flow limiter conveyor 20 form a stream of letters that is relatively easily handled, in that there are no large bunches of letters in the stream of letters leaving the flow limiter, nor are there ordinarily any voids in the stream. The elimination of voids along the entire machine is important, in order to make it possible for the machine to continuously handle the high input rate of letters from the input conveyor belt 10.

Letters leaving the flow limiter conveyor 20 are advanced by a horizontal plane pre-singulator conveyor feed belt 22, and are prevented from falling over by inner and outer side rails 24, 26. The letters must pass a spring loaded pressure finger 28 (FIG. 1), urging the letters against the inner rail 24 (FIG. 1). This action, in conjunction with a bend 24a (FIG. 1A), in the inner rail 24, urges the letters against the inner rail 24, and assists in smoothing out the flow of letters supplied to a pre-singulator conveyor 30, FIG. 1A.

The pre-singulator conveyor 30, includes a vertical plane vacuum belt and a restrainer bar. The presingulator conveyor 30 discharges letters in a stream, with the letters overlapped. The lap pattern can take either of two forms, one form of which (FIGS. 15 and 16) can be immediately singulated by an accelerator conveyor upon leaving the pre-singulator conveyor. When letters having the other form of lap leave the presingulator conveyor (FIG. 17), the accelerator conveyor does not gap the letters, but delivers them in the same lap formation in which they were received.

To accomplish this, letters leaving the vacuum belt pre-singulator conveyor 30 are advanced by the singulator vacuum belt along a guide rail 34, which conducts the letters to a letter accelerator conveyor 35. The accelerator conveyor 35 includes a driven accelerating wheel 36, a spring loaded pinch wheel 38, and a horizontal plane accelerator belt 39. As mentioned, the accelerator conveyor 35 delivers the letters to a shingle former conveyor 40, either singulated (gapped), (FIGS. 15 and 16), or lapped. If the letters are lapped, they will be lapped in the manner shown in FIG. 17. This form of lap insures that downstream units can fully singulate the stream of letters.

Letters entering the shingle former conveyor 40 are moving at a higher linear rate than that of the letters passing through the presingulator conveyor 30. This insures clearance of the letters from the downstream end of the pre-singulator conveyor 30. The shingle former conveyor 40 slows down and laps letters that have been singulated and gapped by the accelerator conveyor 35. In the latter case, the shingle former conveyor 40 rearranges the letters in the proper lapped condition. If the letters are delivered to the shingle former conveyor in the lapped condition of FIG. 17, the conveyor maintains that lapped condition. After leaving the shingle former conveyor 40, the letters will always be lapped in a manner which insures final singulation at the output of the apparatus of the present invention., Letters leaving the shingle former conveyor 40 (FIG. 1A), are advanced by a buffer feeder conveyor 50, in the same lapped condition in which they were received. These letters are at first picked up by a buffer feeder transport belt conveyor 44, and buffer feeder conveyor lead-in rails 46 and 48 direct the letters to a buffer feeder vacuum belt conveyor 47.

A lead-in plate 52 (FIG. 1A), directs the letters into the helical buffer conveyor B. The helical buffer conveyor B includes a horizontal plane edger belt conveyor 54, operating at an angle to the system axis, and a fixed front edge lead in guide plate 56. Plate 56 and the edger conveyor 54 direct letters against an edger or restrainer bar 58 forming part of the helical buffer conveyor B. The helical buffer conveyor B serves to peel off the letters arriving from the shingle former conveyor in a lapped condition, the nature of the lap making possible the peel-off action without disturbing letters just upstream. No letters reach the buffer conveyor B in the other lapped condition (see FIGS. 15 and 16, delivery end of the presingulator conveyor). If letters were presented to the helical buffer conveyor B in the lapped condition just referred to, the peel off action would tend to lay downstream letters over. The buffer conveyor B assists in maintaining edging of stacked mail and also clears mail which might fall down under the helix 64 causing an obstruction to other incoming mail.

The helical buffer conveyor B, in addition to the edger belt conveyor belt 54, includes a restrainer, or edger bar 58, and a laterally conveying, spring biased, rotating helix 64. All of these cooperate to build up a stack of edged letters of varying depths for presentment to the final singulator conveyor 70. The helix 64 of the buffer conveyor B, being spring biased, converts variations in the rate of input to the buffer conveyor B, into variations in the depth of thickness of an edged stack of letters presented to the final singulator conveyor 70. It also allows freedom for the mail pieces to settle up to the edger bar 58 while being transported between the helical flights before being discharged from the helix 64 to form a stack.

The input section of the final singulator conveyor 70 includes a vertical plane vacuum conveyor belt 71, which belt is apertured for cooperating with a vacuum box 72. The vacuum belt 71, coacting with edger bar 58 (FIG. 1A), peels off letters one by one from the stack of edged letters formed by the helical buffer conveyor B, and conveys them in the lapped condition to cooperating pinch rollers 73, 74, the roller 74 being spring loaded. The pinch rollers 73, 74 hold the letters against the final singulator vacuum belt 71, as the letters bridge the gap between the vacuum box 72 and a second final singulator vertical belt 75. The final singulator 70 also includes an underlying horizontal plane belt 76. The letters are then advanced by the final singulator vertical belts 71 and 75, and the horizontal belt 76 in a lapped condition to a second accelerator conveyor A (FIG. 1B). The second accelerator conveyor A includes a driven accelerator roller 77, and a spring loaded pinch roller 78, which accelerates and gaps the letters. The gapped letter stream is delivered by the accelerator conveyor A between a pair of pinch belts 79, 79a (FIG. 1B), which deliver the gapped letters to a facer-canceller, or other device, not shown.

Having described the general nature of the system of the present invention the various units thereof will be now described individually and in more detail.

FLOW LIMITER CONVEYOR

The flow limiter conveyor 20 previously referred to, is shown in more detail in FIGURES 2–5. The flow limiter conveyor includes a vertically disposed letter advancing belt 80, which advances the letters resting on that belt, in opposition to a vertically disposed retrograde belt 82, that engages the opposite sides of the letters passing through the flow limiter, which letters do not engage the advancing belt 80.

The vertical flow limiter belts 80 and 82 are operated by a two speed drive motor 86 (FIGS. 3–5). The drive motor 86 has a pulley 87, around which is trained a drive belt 88 that turns a pulley 90 for driving gear box 92, through a shaft 93. Mounted on the shaft 93 of the gear box 92 is a transfer pulley 94, which operates a drive belt 96, for the transport belt 14 that supports letters passing through the flow limiter.

The drive belt 96 turns a driving belt pulley 98 for the transport belt 14, which pulley is mounted on a drive pulley shaft 100. The shaft 100 mounts and turns a downstream belt driving roller 102 (FIGS. 2 and 3) for the transport belt 14. At the input end of the transport belt 14, an idler roller 104 for the belt is mounted, and a take-up pulley 106 is also included to adjust the belt tension.

As seen in FIGS. 2–4, the drive belt 96 just described, also drives a rubber roller 114, is located between the end of the belt 14, and the start of the belt 22. The speed of the roller 114 exceeds that of both belts 14 and 22, causing letters standing on end to tip to their long edge. The roller 114 is driven by a pulley 110 (FIG. 3), mounted on a shaft 112, and the pulley 110 is driven by the belt 96 previously mentioned.

As previously mentioned, the flow limiter conveyor 20 includes advancing and retrograde belts 80 and 82 (FIG. 2), which belts are vertically oriented. These flow limiter belts are also driven from the gear box 92, previously mentioned. In order to drive the belts, a power take-off pulley 118 (FIGS. 3 and 5) is driven from the gear box 92. Pulley 118 drives a V-belt 120, tensioned by an idler 122 (FIG. 5). The V-belt 120 drives a pulley 124 (FIG. 5) for driving the vertical plane flow limiter advancing belt 80. The pulley 124 is mounted on a shaft 126, which carries the driving roller 128 (FIG. 2) for the advancing belt 80 of the flow limiter. As seen in FIG. 2, the belt 80 passes over a pinch pulley 130, for forming a letter gripping channel between belts 80 and 82 (FIG. 2). The delivery end of the advancing belt 80 of the flow limiter 20, is trained around an idler belt pulley 132 (FIG. 2).

The retrograde belt 82 of the flow limiter conveyor 20 is driven by a pulley 136 (FIG. 5) and the belt 120 driven by the gear box 92 previously mentioned. The V-belt drive pulley 136 for the belt 120, is mounted on a shaft 138, which carries a driving roller 140 (FIGS. 2 and 5) for the retrograde belt 82 of the flow limiter conveyor.

As seen in FIGURE 2, a pinch pulley 142 is mounted between the reaches of the retrograde flow limiter belt 82. The pinch pulley 142 for the vertical plane retrograde belt 82, and the pinch pulley 130 for the vertical plane advancing belt 80, cooperate to provide a narrow channel between the belts 80 and 82 for advancing letters while limiting the flow of the letters to an output pattern that can be handled by the apparatus downstream of the flow limiter. The delivery end of the retrograde belt 82 of the flow limiter is trained around an idler pulley 144 (FIGS. 2 and 4).

THE PRESINGULATOR CONVEYOR

The presingulator conveyor 30, which has been previously mentioned relative to FIGURE 1A, is disclosed in more detail in FIGURES 6 to 9. As mentioned this device operates generally on the same principle as that of the co-pending application of Gutierrez, Ser. No. 212,242 filed July 25, 1962, and assigned to the assignee of the present invention. As previously mentioned, letters are carried into the presingulator conveyor 30 by the horizontal plane presingulator conveyor feed belt 22. The horizontal plane belt 22, the accelerating roller 36 of the accelerator conveyor 35, and the belts of the shingle former conveyor 40 are all driven by various belts and pulleys by a motor 150 (FIGS. 7 and 9).

The motor 150 drives a V-belt pulley 151 (FIGS. 7 and 9) which turns a drive belt 152 that drives a countershaft pulley 154, best seen in FIGURE 9. Pulley 154 is mounted on a primary countershaft 156 (FIGURES 7, 9 and 10). As best seen in FIGURES 9 and 10, the primary countershaft 156 mounts a presingulartor feed belt take off pulley 158. Pulley 158 drives a presingulator feed belt primary drive V-belt 160, best seen in FIGURE 7. Belt 160 drives a primary driven pulley 162 (FIGURE 7) mounted on a secondary countershaft 164. The countershaft 164 mounts a secondary take off pulley 166 (shown in dotted lines in FIGURE 7), which drives a secondary drive V-belt 168. The V-belt 168 is trained around a driving V-belt pulley 170 (FIGS. 7 and 10), for the horizontal plane presingulator conveyor feed belt 22.

As seen in FIGURE 10, the V-belt pulley 170 drives the driving roller 171, for the horizontal plane feed belt 22. As seen in FIGURE 7, the input end of the feed belt 22 is trained around an idler roller 172, and a take-up roller 174 is also provided.

The presingulator conveyor 30 includes a vertical plane vacuum belt 178 which is apertured as seen in FIGURES 7 and 8, for cooperation with a vacuum box 180, as described in the previously mentioned co-pending application of Guiterrez, Ser. No. 212,242.

Cooperating with the vertical plane vacuum belt 178, and the vacuum box 180 of the presingulator conveyor 30 is a restrainer 182, shown somewhat diagrammatically, in FIGURE 6, and in detail in FIGURE 8. As seen in FIGURE 8, the upper reach of the horizontal plane presingulator feed belt 22 is supported by a support plate 184 for conducting letters to the restrainer 182 of the presingulator conveyor 30. The restrainer 182 includes a fixed restrainer bar 186 (FIG. 8) and a retractable restraining nose or finger 188. The finger 188 is mounted on a link 189, supported on parallel links 190, 191 having fixed pivots 190a and 191a. A spring 192 connects to link 191, which is pivoted at 191a to the restrainer bar 186, and the spring urges the restrainer finger 188 to its projected position, closely adjacent the vacuum belt 178. The gap between the restrainer finger 188, and the vertical plane vacuum belt 178 can be adjusted by adjustment of a stop bolt 194 (FIGURE 8), which restricts the motion of the link 191 in response to the force of the finger projecting spring 192.

Means are provided to retract the restrainer finger 188, in case of a jam at the entrance to the presingulator. This jam would normally prevent letters from passing between the restraining finger 188 and the vacuum belt 178. Retraction of finger 188 is accomplished by a finger retracting solenoid 196 (FIGURE 8) having an armature 197 into which is fitted the bent end 198a of a finger retracting pin 198. A spring 199 is connected at its upper end to the bent end 198a of the retracting pin 198, and at its lower end to a spring anchor 200 mounted on the fixed restrainer bar 186. The spring 199 pulls the solenoid armature 197 against a similarly mounted stop 201. The lower end of the retracting pin 198 is bent to form a hooked end portion 198b, which hook is normally slightly below a shiftable pivot pin 202, that connects link 191 to the link 189 that mounts the restrainer finger 188. The slight gap between the hook 198b and the shiftable pivot pin 202 provide normal limited retraction of the restraining finger 188 by letters as they pass between the finger 188 and the vacuum belt 178.

For jam release a photoelectric unit PC1 including a lamp and a photosensitive device is located upstream of the restrainer 182. A similar photocell unit PC2 is mounted downstream of the restrainer 182. These photocell units serve as jam clearing devices, and are connected into a circuit which will be explained in detail, after completion of the description of the mechanical features of the invention.

The driving mechanism for the vertical plane presingulator conveyor vacuum belt 178, and the acceleration pinch roller 36, will now be described in detail. The vertically disposed vacuum belt 178 of the presingulator conveyor 30 is trained around a driving roller 206 (FIGURES 6 and 8), and an adjustable idler roller 208. The drive roller 206 for the vacuum belt 178 is mounted on a shaft 210, and is driven by a gear box 212 (FIG. 7). The gear box 212 is driven by a V-belt 214, passing around a drive pulley 216 (FIGURE 10) mounted on the countershaft 156, previously described. As previously mentioned, the countershaft 156 is driven by the motor 150 through the V-belt 152 (FIGURE 7). The driven V-belt 214, drives the gear box 212, by means of a pulley 218 (FIGURES 7 and 9) mounted on the input shaft of the gear box. The gear box 212 drives a vertical output shaft 220 (FIGURES 7 and 10), which shaft mounts a driving V-belt pulley 222 for driving the acceleration roller 36, and the presingulator vacuum belt 178.

This drive is accomplished by means of a primary drive V-belt 224, trained around pulley 222 (FIGURES 7 and 10) for driving a pulley 226 mounted on the lower end of a vertical countershaft 228 (FIG. 7). The acceleration roller 36 is mounted on the upper end of the vertical shaft 228.

In order to drive the presingulator conveyor vacuum belt 178, a takeoff V-belt pulley 230 is mounted on the vertical acceleration wheel shaft 228 (FIGS. 7 and 10). The V-belt pulley 230 drives a secondary V-belt 232, which drives a V-belt pulley 233 (FIG. 7) mounted on the lower end of the vertical shaft 210, which carries the drive roller 206, for the presingulator conveyor vacuum belt 178 (FIG. 6), as previously described.

ACCELERATING CONVEYOR

The accelerating conveyor 35 follows the presingulator conveyor 30, and increases article speed to facilitate the action of the shingle former conveyor 40. The path of letters through the first accelerator conveyor 35 is inclined from the longitudinal axis of the system for delivering articles in an effective manner to the shingle former conveyor 40.

In order to drive the horizontal plane accelerating belt 39 of the first accelerator conveyor 35, which belt cooperates with the accelerating roller 36 to feed letters to the shingle former conveyor 40 (FIG. 6), a take off pulley 236 is also mounted on the countershaft 156 (FIGS. 7, 9 and 10). The pulley 236 drives a power take off V-belt 238, which drives a drive pulley 240 (FIGS. 6 and 9) for driving the driving roller 242 (FIGS. 6, 7 and 10) for the horizontal plane belt 39, of the first accelerator conveyor 35. The delivery end of the accelerator conveyor belt 39 is trained about an idler pulley 244 (FIG. 7).

SHINGLE FORMER CONVEYOR

The driving mechanism for the shingle former conveyor 40 will now be described in detail. As seen in FIGURE 6, the shingle former conveyor 40 includes a vertical plane inner belt 248 trained around a drive roller 250 mounted on a drive roller shaft 252. The advancing reach of the inner belt 248 is straight, but is inclined from the longitudinal axis of the machine, oppositely from the inclination of the accelerator conveyor belt 39. The vertical shaft 252 (FIGS. 6, 7, and 10) for driving the inner belt 248 of the shingle former conveyor, is driven by a V-belt pulley 254 (FIGS. 7 and 10). In order to drive the V-belt pulley 254, a take off pulley 256 (FIGS. 7 and 10) is mounted on the vertical gear box shaft 220 (FIGS. 7 and 10). The pulley 256 drives a V-belt 258 which, as best seen in FIGURE 10, is trained around the V-belt pulley 254 (FIGS. 7 and 10). As was previously described, the pulley 254 is mounted on the vertical drive shaft 252, for driving the roller 250 (FIG. 6) of the inner vertical plane belt 248 of the shingle former conveyor 40. A takeup idler 260 (FIG. 10) is provided for the V-belt 258 that drives the shingle former conveyor. The other end of the inner belt 248 passes around an idler roller 261 (FIGS. 1 and 6).

In addition to the inner belt 248, the shingle former conveyor includes an outer belt 264, driven by a driving roller 266 mounted on a shaft 268. The shaft 268 mounts a drive pulley 269 which is driven by the V-belt 258 (FIGS. 7, 9 and 10). The V-belt 258 is the same belt that drives the inner vertical plane, flat belt 248 of the shingle former conveyor as previously described.

The outer advancing reach of the belt 264 of the shingle former conveyor passes around an idler 270, in order to provide a conveying reach that runs along a portion of the conveying reach of the inner belt 248. An idler pulley 271 for the inner vertical plane flat belt 264 is mounted so that a delivery reach-portion 272 (FIG. 6) is provided, which reach converges toward the straight advancing reach of inner belt 248 and parallels the accelerator conveyor horizontal plane belt 39. Trailing portions of letters delivered between the nip of the two vertical plane shingle former conveyor belts 248 and 264, are free to swing laterally against a free reach portion 273 of the belt 248 (FIGS. 15–17). The free reach-portion 273 of the inner belt 248, and the divergent input reach portion 272 of the outer belt 264 provide a divergent input throat for articles delivered from the first accelerator conveyor 35, and accommodates the aforesaid swinging of the trailing portions of letters after they are gripped between the nip of the belts at the idler pulley 270.

BUFFER FEEDER CONVEYOR

As seen in FIGURE 1A, the buffer feeder conveyor B follows the shingle former conveyor 40. The buffer feeder conveyor B includes the vertical plane, apertured vacuum belt 47, which is driven by a drive roller 276 mounted on a vertical shaft 278 (FIGS. 11 and 11A). The buffer feed conveyor vacuum belt 47, as well as units associated with the helical buffer B, are all driven by a motor 280 (FIGS. 11 and 11A). A drive motor pulley 282 (FIG. 11) drives a V-belt 284 which is trained around a gearbox pulley 284a and a main drive pulley 286 mounted on a countershaft 288 (FIGS. 11 and 11A). A take-off pulley 290 (FIGS. 11 and 11A), mounted on the other end of countershaft 288, drives a V-belt 292 which in turn drives a pulley 294 for driving a gear box 296. The gear box 296 drives the vertical shaft 278, for driving the roller 276 that drives the vertical plane buffer feeder conveyor vacuum belt 47. The receiving end of the belt 47 is trained around an idler roller 298 (FIGS. 1A and 11). As seen in FIGURE 1A, a vacuum box 302, having an apertured face plate 303, and a vacuum connection 304, cooperates with the apertured vertical plane vacuum belt 47 of the buffer feeder conveyor 50.

The buffer feeder conveyor horizontal plane transport belt 44 (FIG. 11), is driven by a take-off pulley 308 on the countershaft 288 (FIG. 11A), previously described. A generally vertical V-belt 310 trained around the take-off pulley 308, drives a pulley 312 (FIG. 11), which is connected to the driving roller 314 at the downstream or delivery end of the buffer feeder transport belt 44.

EDGER BELT DRIVE

The edger belt 54, associated with the helical buffer conveyor B, is driven by a pulley 316 (FIG. 11A), on the countershaft 288. The countershaft 288 drives a vertical belt 318, which in turn drives a pulley 320 connected to a drive roller 322 for driving the edger belt 54 (FIGS. 11, 11A and 13). The edger belt 54 is trained about idler rollers 324, 326 (FIG. 13) to provide an upper reach 328 of the edger belt 54, for carrying letters into the helical buffer conveyor B.

HELICAL BUFFER CONVEYOR

The construction of the helical buffer conveyor B appears in FIGURES 11 to 14. The helical buffer conveyor resembles in part, the helical stacker that forms the subject matter of Guitierrez, Ser. No. 189,737, filed Apr. 24, 1962 and assigned to the FMC Corporation, the assembly includes end plates 332, 334 (FIG. 12), which rotatably mounts a helix drive shaft 336 in bearings 335, 337 (FIG. 12). In order to rotate the helical buffer conveyor shaft 336, a V-belt pulley 338 (FIGS. 11A and 12), is mounted on one end of the shaft 336, and is driven by a vertical V-belt 340, and a pulley 340a, which is the output drive pulley of a gear box 341 (FIGS. 11 and 11A).

The gear box 341 is driven by the pulley 284a and the V-belt 284, as previously descirbed.

The helical buffer conveyor B includes a sleeve 342, slidable on the shaft 336, which sleeve mounts the helix 64 previously mentioned. The helical buffer conveyor drive shaft 336 is rotatably coupled to the sleeve 342 by a conventional key 344, fitting into a longitudinal groove 345 in the sleeve 342. The sleeve 342 is shouldered at 346 (FIG. 12) for receiving a spring seat collar 348, which seats one end of a helix relief spring 350. The other end of the helix relief spring 350 seats on a spring collar 352 fixed to shaft 336, and hence rotates with the helical buffer conveyor drive shaft 336.

In order to provide for a manual clearing of the helical buffer conveyor, a manual release handle 356 (FIGURES 12 and 13) is provided. The lower end of the handle is connected to a slidable carriage 358 (FIGURE 13). The carriage 358 slides on a support rod 360 mounted in the buffer frame. In order that the release handle 356 can shift the sleeve 342 of the helical buffer conveyor, an annular groove 362 is formed in the sleeve 342. A carriage roller 364 fits in the annular groove 362 formed in the sleeve 342. The carriage 358 is also provided with a guide roller 366 which rides along a longitudinal track 368, as seen in FIGURE 13.

In order to mount photocell units for controlling the depth of letters, stacked by the helical buffer B, a photocell bracket 370 is provided (FIGS. 12 and 13), which mounts three photocell units namely, PC3, PC4 and PC5 (FIG. 12). As seen in FIGURE 14, the edger or restraining bar 58, associated with the helical buffer conveyor B has mounted at the end thereof a spring loaded finger 372, the mounting and construction of which is the same as that for the finger 188 of the restrainer 182 of the pre-singulator conveyor 30 shown in FIGURE 8.

FINAL SINGULATOR CONVEYOR

The final singulator conveyor 70, as previously mentioned, picks up one-by-one letters presented thereto as an edged stack of letters by the helical buffer conveyor B. The final singulator conveyor 70 has an inner, vertical plane vacuum belt 71 previously described (FIGS. 1A and 11A), and the belt 71 passes around an idler roller 378 (FIGS. 1A and 14). The vacuum box 72 has a vacuum connection 382 to a vacuum pump 384 (FIGS. 11 and 11B).

The drive for the final singulator conveyor 70 is shown in FIGURES 11, 11B and 11C. A motor 390 drives a V-belt 392, which drives a gear box 394 by a horizontal shaft 396. A pulley 398 (FIG. 11B) on the shaft 396 of gear box 394, drives a V-belt 400 (FIGS. 11 and 11B) that turns the driving roller 402 (FIG. 11), for the horizontal plane final singulator conveyor belt 76.

In order to drive the inner vertical plane belt 71 (FIG. 1B), of the final singulator conveyor 70, the gear box 394 has a vertical shaft 404 (FIGS. 11B and 11C), mounting a pulley 406 (FIGS. 11B and 11C), that drives a horizontal plane V-belt 408. V-belt 408 drives a pulley 410 (FIG. 11C) on a vertical shaft 412. Shaft 412 mounts a drive roller 414 (FIG. 1B) that drives the vertical plane, final singulator belt 71.

The other final singulator belt 75 (FIG. 1B), is driven by a pulley 416 that engages the V-belt 408 (FIG. 11C), and drives a shaft 418, which mounts a belt driving pulley 420 (FIG. 1B).

RELATIVE LINEAR SPEEDS OF THE UNITS

The relative linear speeds of the various units just described have been carefully selected to insure the presentation of a stack of edged mail by the helical buffer B to the final singulator conveyor 70, without normally creating jams and without introducing voids of substantial extent between the letters being handled by the system. The system, as previously mentioned, will handle 30,000 letters per hour, averaging about 7½ inches or so in length. The table of relative speed given below, describes speeds for the various units which have been found to successfully handle letter mail of the type previously described at the rate of 30,000 letters per hour. Of course punch cards and other documents can be handled by the apparatus of the present invention, although some adjustment of the relative speeds given in the table below might be necessary to adjust the machine to a specific service.

*Table 1.—Relative speeds*

| | |
|---|---|
| Feed belt 10 | ft./min__ 380 |
| Transport belt 14 | ft./min__ 175 |
| Flow limiter belt 82 | ft./min__ 225 |
| Flow limiter belt 80 | ft./min__ 250 |
| Presingulator feed belt 22 | ft./min__ 210 |
| Presingulator vacuum belt 178 | ft./min__ 550 |
| Accelerating wheel 36 | ft./min__ 950 |
| Accelerating belt 39 | ft./min__ 950 |
| Shingle former belts, 248, 264 | ft./min__ 250 |
| Buffer feeder belt 47 | ft./min__ 400 |
| Edger belt 54 | ft./min__ 450 |
| Buffer helix 64 | r.p.m__ 400 |
| Final singulator belts, 71, 75 | ft./min__ 400 |
| Final singulator support belt 76 | ft./min__ 400 |

OPERATION

The operation of the mechanical units of the mail handling apparatus of the present invention, a detailed description of which has been completed, will now be briefly described. The operation of electrical antijam circuits for the flow limiter and presingulator conveyors, and the stack depth limiting circuits of the helical buffer, will be described in detail following the brief résumé of the operation of the mechanical units presented below.

Articles, such as letter mail in the example of the invention being described, are supplied in random groups, bunchings, laps, etc., by the input feed belt 10, and are transferred to the transport belt 14. In the example being given, the articles being handled, such as letter mail, includes envelopes averaging 7½ inches in length with a maximum length in the order of 11½ inches. These are supplied at the rate of 30,000 articles per hour to the transport belt 14 of the apparatus, by the feed belt 10. FIGURE 2A is a diagrammatic representation of one of the many patterns of incoming mail that are presented to the flow limiter conveyor 20 by the transport belt 14.

These letters leave the flow limiter conveyor 20 in a relatively continuous thin row or line of overlapped letters, as seen in FIGURE 2B. However, the flow limiter conveyor continues to pass letters at the input rate of 30,000 per hour, or 500 per minute. It will be noted that the advancing belt 80 of the flow limiter conveyor is traveling at 250 feet per minute, whereas the retrograde belt 82 travels in the opposite direction at 225 feet per minute. This belt action, coupled with the guiding of the belts by opposed rollers 130, 142 (FIG. 2), exert an action on the letters which converts them into a relatively continuous homogenous stream as seen in FIGURE 2B. Letters thus presented to the presingulator conveyor 30 ordinarily normally prevent jamming or piling up of the letters at the restrainer 182 of the presingulator conveyor.

The system of the present invention insures that the shingle former conveyor 40 can swing the trailing end of every letter clear of the leading end of the downstream letter, as previously described, regardless of the letter pattern presented to the presingulator conveyor 30. The letter L can be presented to the nose 188 of the restrainer 182 of the presingulator conveyor 30 in any of several three basic patterns or relative positions, and with two of these patterns, the letters must be completely singulated before reaching the shingle former, if not, the trailing end of a leading letter will be caught under the leading end of a trailing letter at the shingle former. For example, in the diagram of FIGURE 15, letters L at the restrainer nose 188 of the presingulator conveyor 30, are in a vertically aligned or "edged" formation. As seen in FIGURE 15, the originally edged letters leaving the presingulator conveyor will be lapped in what will be termed a "pre-conveyor "presingulating lap." The term "presingulating lap" is applied to the letters leaving the presingulator conveyor 30 in the conditions of FIGURE 15, for the reason that the original overlap of the stack of letters presented to the presingulator conveyor 30 has not only been reduced, but has been reduced to such an extent that the acceleration roller 36 of the accelerator conveyor 35, and its associated horizontal plan belt 39 (not seen in FIG. 15), will complete singulation of the pre-singulated letters. The accelerator conveyor 35 introduces a small gap between these letters, for presentation to the shingle former conveyor 50.

The letters leave the presingulator 30 in a "presingulating lap," as seen in FIG. 15, because when edged letters are presented to the restrainer 182, the letter in the stack that is remote from the vacuum belt, is at least no farther advanced than is the letter which is in engagement with the vacuum belt 178. Since the friction between the vacuum belt and a letter exceeds that between letters, if the restrainer bar 182 pass two or nine letters, the pre-singulator conveyor 30 will substantially decrease the amount of letter overlap, the decrease being sufficient for complete singulation by the accelerator conveyor 35, as described. Complete singulator of the slightly lapped letters leaving the presingulator conveyor 30 in the lap pattern of FIG. 15 is necessary before the letters reach the helical buffer conveyor B, because the helix 64 cannot readily peel off a leading letter completely from the stream without some interference by the next trailing letter.

FIGURE 16 shows letters presented to the presingulator conveyor 30 in what has been termed a "pre-singulating lap," although the amount of overlap is considerable. The pre-singulator conveyor 30 will decrease the lap of these letters also, but the overlap of the letters L leaving the presingulator conveyor 30 will usually be smaller than the overlap in the initially edged condition of FIGURE 15. This occurs because the letter adjacent the vacuum belt 178 in FIG. 16 is already farther advanced than the next adjacent letter in the stack. As in FIGURE 15, the letters leaving the pre-singulator conveyor 30 in the condition of FIGURE 16, will also be completely singulated by the accelerator conveyor 35, the gap between the letters usually exceeding that in the condition of FIG. 15.

If it were possible to always present stacks of letters to the pre-singulator conveyor 30 in either of the patterns shown in FIGURES 15 and 16, such letters would be completely singulated by the accelerator conveyor 35. In these special cases, there would be little or no need for inserting the shingle former conveyor 40 between the accelerator conveyor 35 and the helical buffer conveyor B, for the reason that the helical buffer conveyor will readily peel off and stack a stream of letters received in a completely singulated condition.

However, it cannot be assumed that letters reach the pre-singulator conveyor 30 consistently, in one or the other of the conditions shown in FIGURES 15 and 16. For example, in FIGURE 17, a stack of lapped letters L is presented to the pre-singulator conveyor 30 in a lapped condition such that the letter at the vacuum belt 178 of the pre-singulator conveyor is trailing letters remote from the vacuum belt. In the condition of FIGURE 17, although the pre-singulator conveyor does spread the letters before they reach the accelerator conveyor, the spread is insufficient to permit the accelerator conveyor to completely singulate individual letters, as in the cases of FIGURES 15 and 16. Unlike the conditions of FIGURES 15 and 16, in the situation of FIGURE 17, the letters are presented to and will leave the accelerator conveyor 35 in the type lap formation which the helical buffer conveyor B is designed to handle, but the extent of overlap is undesirably large. However, the accelerator conveyor 35 reduces the extent of the lap of the letters, to a degree that is more than sufficient for peeling off by the buffer conveyor B.

The shingle former conveyor 40 ensures that the letters L leaving the accelerator conveyor in the lapped condition of FIGURE 17, remain in the same lapped condition when they are presented to the buffer feeder conveyor 50. As previously explained, the reason that this is important to the apparatus of the present invention is that the helix 64 of helical buffer conveyor B, which in conjunction with the buffer conveyor edger belt 54, gently edges the letters, can only peel off the overlapped letters when they are presented to the helical conveyor lapped in the lap formation shown at the output of the shingle former conveyor 40 in each of FIGS. 15 and 17. As mentioned, if the letters were always presented to the helical buffer conveyor B in a pre-singulated condition (as in FIGURES 15 and 16), the shingle former conveyor 40 might theoretically be unnecessary. However, the shingle former 40 does slow down the stream of letters, and in fact, re-laps completely singulated letters presented to the lap shown in FIGS. 15 and 16. In every case, the letters are always presented to the helical buffer conveyor in a lapped condition for which the helical buffer is designed to operate. The slowing down of the letters precludes damage when they strike the edger bar 58 at the helical buffer conveyor B. The temporary change in direction of the letters L as they enter the shingle former conveyor 40, is indicated in broken lines in FIG. 17. The trailing edge of a letter entering the nip of the conveyor belts 248 and 264 at the idler 270 will swing clear of the leading edge of the downstream letter, the latter remaining "beneath" the leading letter as these letters advance through the shingle former. This ensures that the type of lap required by the helical buffer conveyor will be maintained when the letters are presented to the buffer feeder conveyor 50, for eventual reception by the helical buffer conveyor B. Even completely singulated letters presented to the shingle former in the conditions of FIGS. 15 and 16 will be slowed down and properly lapped, with consistent results as to final edging and stacking of the letters in the helical buffer conveyor B.

As seen in FIGURES 1A, 8 and 16A, the system of the present invention includes vertical entering guides 24, 26 for the presingulator conveyor 30.

Because of these guides, letters approaching the presingulator conveyor 30 in the type of lap shown in FIG. 16, with the trailing edge of a given leading letter being disposed between the outer guide 26 and the leading edge of the next trailing letter, remain in this type of lap. This reduces the chances of jamming at the pre-singulator conveyor. This result, which is ideal, although not completely attainable in practice, is facilitated by the inclined wall portion 24a of the outer guide rail 24, and by the spring loaded finger 28 (FIG. 16A), which urges the letters against the outer guide rail 24 so that they must slide down along the inclined guide portion 24a before they reach the restrainer 188 of the presingulator conveyor 30.

The letters L entering the helix 64 of the helical buffer B, are entered in the same, correctly lapped condition that they had leaving the shingle former conveyor. The helix 64 will peel off or remove letters from the entering lapped stream of letters supplied to the helical buffer, by the buffer feeder conveyor 50. These letters, which are urged to the left as seen in FIGURE 14, by the edger belt 54, ride across the support plate 52 and are carried by the edger belt 54, against an inclined cam plate 56, and this action continues as the letters are advanced by the helix 64, laterally (FIG. 12) toward the belt 71 of the final singulator conveyor 70. Under the action of the edger belt 54, the letters strike and remain against the right hand edge of the helical buffer conveyor restrainer bar 58, as seen in FIGURE 14. The inclined plate 56 assists in preventing damage to the leading edge of the letters as they are brought against the restrainer bar 58.

The letters L are presented to the restrainer bar 58 by the edger belt 54, at a linear speed which is high enough to insure uniform handling of the mail input without any appreciable voids, but low enough to preclude damage to the leading ends of the letters by the edger bar. As mentioned, the shingle former conveyor 40 assists in obtaining this general result. The letters advance axially along the helix 64 with their leading edges sliding along the bar 58, until the letters reach the vacuum conveyor belt 71, of the final singulator conveyor 70, as seen in FIGURE 12. The vacuum belt 71 of the final singulator conveyor 70, removes, in cooperation with the horizontal support belt 76, the letters from the stack presented to the belt 71 in substantially the same lapped condition in which they left the shingle former.

If conditions downstream of the helical buffer B are such that letters are being supplied to the helical buffer at a rate faster than the final singulator conveyor 70 removes them, then a stack of letters will accumulate between the delivery end of the helix 64 and the final singulator vacuum belt 70, as seen in FIGURE 12. Since the helical buffer helix 64 is slidably mounted on the shaft 336 by means of the sleeve 342, and is urged toward the vertical valve vacuum belt 71 of the final singulator 70, by the spring 350 (FIG. 12), if letters accumulate between the final turn of the helix 64 and the vertical plane vacuum belt 71 of the final singulator 70, at a rate faster than they are removed by the belt 71, the stack of letters will gradually increase in thickness, with the helix 64 being forced to the right as viewed in FIGURE 12, against the spring 350 to accommodate this increased stack depth. On the other hand, if a stack of letters is accumulating between the final turn of the helix 64, and the vacuum belt 71 of the final singulator conveyor at a rate slower than the take-away rate of the final singulator conveyor 70, then the thickness of a stack of letters at the delivery end of the helix 64 will gradually decrease.

Thus, the helical buffer conveyor B absorbs increases and decreases of the rate of letters supplied to the final singulator conveyor 70, so that the overall operation can be continuous, and the letters carried through the final singulator conveyor 70 will be lapped in the lap formation of the type produced at the shingle former conveyor. These letters are properly arranged in the final singulator conveyor 70 for presentation to the accelerator A (FIG. 1B), which gaps the letters and presents them to the take-away conveyor T (FIG. 1B) leading to a facer-canceller or other machine in a gapped condition. As will be seen presently, control means are provided at the helical buffer B, to maintain a stack of edged letters for pickup by the final singulator 70 at a good operating depth or thickness, without permitting the stack to become so thick as to cause a jam in the helical buffer B. The stack depth thickness control for the formation of edged letters by the helical buffer B, is performed by signals from the photocell units PC3, PC4 and PC5, shown schematically in FIGURE 12, operating in conjunction with a flow control circuit, the details of which will be described presently.

*Anti-jam circuit for the shingle former conveyor*

FIGURES 24 and 24A to 26 and 26A illustrate the electrical circuits for preventing multiple, non lapped feed of letters to the shingle former conveyor, and for preventing jamming at the presingulator conveyor 30 by curled edge letters, along with the schematic diagrams of certain letter dispositions presented to the presingulator conveyor 30.

Referring to FIGURES 24 and 24A, the latter figure shows a leading letter L1, which has been carried past the presingulator restrainer finger 188 by the vacuum belt 178, and is being advanced by the acceleration roller 36 and the horizontal plane belt 39. This outgoing letter L1 (FIG. 24A) has eclipsed the photocell unit PC2. At the input side of the presingulator conveyor 30, a string of letters L2, L3 and L4 are being presented to the restrainer finger 188. It will be noted that the leading end of letter L2 is curled up in a manner which will render it difficult for the vertical plane vacuum belt 178 of the presingulator 30 to carry letter L2 past the restrainer finger 188, and onto the accelerating wheel 36, of the accelerating conveyor 35, for the shingle former conveyor 40.

Under the conditions of FIGURE 24A, the beams of both photocell units PC1 and PC2 are eclipsed, and hence as illustrated in the circuit diagram of FIGURE 24, the relays P1 and P2 associated with the photocell units PC1, PC2 are de-energized. At this point it will be mentioned that the photocell relays in the circuit diagrams of FIGURES 24–26, and FIGURES 18–23, are connected for "light operation." That is, the photocell relays are energized when their photocells are illuminated. When the designations "NO" (normally open) and "NC" (normally closed), are applied to the various contacts controlled by the photocell relays, these terms represent the condition of the photocell relay contacts when the photocells are dark, and the relay coils are de-energized. Thus a "NO" relay contact closes when the photocell is illuminated, and opens when the photocell is eclipsed. As to the other contacts operated by relays not associated with photocell units, the designation of contacts as NO or NC represents the condition of the contacts when their controlling relay or contactor coils are de-energized.

Returning to the circuit of FIGURE 24, it can be seen that a timer T is connected across the line in series with a normally closed contact P1–1, controlled by the relay coil P1 of the photocell unit PC1. In the same circuit is a normally open contact P2–1, controlled by the relay P2 for photocell unit PC2. In this, the normal condition, the timer T is de-energized. The timer T, when energized, is of the type that does not generate a pulse signal until a preset time delay period has elapsed. In the present invention, this time delay period will be in the nature of one-half to one second. Once energized and timed out, the timer T emits a series of pulses until the timer T is de-energized again. Units of this type are conventional, and are available to the trade as off the shelf items.

With the timer T de-energized by the eclipse of the downstream photocell unit PC2, and the consequent opening of the normally open contact P2–1 in the timer coil circuit, a normally open timer contact T–1 connected across the line and in series with the presingulator solenoid 196, is in its normally open position because the timer T is de-energized. This leaves the presingulator solenoid 196 in its de-energized condition, so that the restrainer finger 188 is disposed close to the vacuum belt. This de-energized condition is the normal condition of the presingulator solenoid 196, as letters are carried past the photocell unit PC–1, upstream of the presingulator restrainer 188. These letters passing through the presingulator conveyor 30, are picked up by the acceleration wheel 36, thereby eclipsing the beam of the downstream photocell unit PC–2. Thus in normal operation of the system, both photocell units PC–1 and PC–2 are eclipsed by letters, and the photocell relays P–1 and P–2 are de-energized, as explained above.

FIGURE 25A shows the condition when the bent letter L–2 reaches the presingulator restrainer finger 188. This letter will not pass the restrainer finger 188, and so would cause a jam upstream of the presingulator restrainer. The leading letter L–1 cleared the presingulator conveyor 30, and so has been advanced clear of the photocell unit PC–2 by the acceleration roller 36. The beam of the downstream photocell unit PC–2 has now been re-established because of a delay in the advance of letters, whereas the beam of the upstream photocell unit PC–1 is in its normal, eclipsed condition, because letters have not cleared the beam.

Referring to the circuit diagram of FIGURE 25, with the beam of the photocell unit PC1 eclipsed by the upstream letters (which condition is normal during the operation), the normally closed contact P1–1 in the timer T coil circuit is closed. However, the beam of the downstream photocell unit PC2, is no longer eclipsed because the letter L1 advances alone, and clears that unit. It is an abnormal operating condition for the beam of photocell unit PC2 to remain uninterrupted. The resultant energization of relay coil P2 under this condition closes a normally open contact P2–1 in the timer T coil circuit. This abnormal condition completes the circuit through the coil of timer T, and the timer T starts timing through its preset delay interval.

In some cases, before the preset time-out period of one-half to one second of the timer T has elapsed, a letter will have cleared the restrainer finger 188 of the presingulator, and will have re-eclipsed the beam of photocell unit PC2, thereby reopening the normally open contact P2–1 in the circuit of the timer T. Under these conditions, the timer T does not affect the operation of the system, because it has not been energized long enough to initiate pulses to the presingulator solenoid 196.

However, in the condition illustrated in FIGURE 25A, if the preset time interval of the timer T elapses (a second or less), this will establish the circuit conditions shown in FIGURE 26. After the relay T times out, it sends pulses which momentarily close the normally open contact T–1 in the circuit of the presingulator solenoid 196. This energizes the presingulator solenoid 196, which retracts the restrainer finger 188 of the presingulator, as shown in FIGURE 26A. The bent letter L2 can now pass on through the presingulator conveyor 30, and onto the acceleration wheel 36 of the accelerator conveyor 35. In case of a severe pile-up upstream of the presingulator restrainer finger 188, the pulsating characteristics of the timer T cause the presingulator solenoid 196 to cyclically retract and advance the restrainer finger 188, and this action continues until the accumulation of letters upstream of the restrainer finger 188 flow through the presingulator normally, and keep the beam of the photocell unit PC2 eclipsed. Normal operation as in FIGURES 24 and 24A is now resumed.

Helical buffer stack thickness control circuit

FIGURES 18, 18A to 23, 23A illustrate diagrammatically a control circuit for the system of the present invention which normally results in a stack of letters L presented to the final singulator 70, and accumulated as an edged stack at the discharge of the helix 64, having a thickness in the order of one inch to four inches. If the stack reaches a thickness of five inches, singulation difficulties may be presented, and the circuit blocks off flow from upstream units feeding the helical buffer B. The motor 86 (FIG. 3) that drives the flow limiter conveyor 20, which controls the upstream feed to helical buffer B, is a two-speed motor. Under normal start-up and operating conditions motor 86 runs at its fast speed. However, if the helical buffer B presents letters to the final singulator 70 faster than they are removed, the thickness of the stack of letters L will increase (compare FIGS. 18, 18A to 20, 20A). When the stack of letters presented to final singulator 70 increases to a predetermined thickness, the motor 86 changes from its fast speed to its slow speed in order to reduce the rate of flow of letters presented to the final singulator 70. If the thickness of the stack of letters L presented to the final singulator 70 is thereby reduced to its normal level, the motor 86 will return to its normal operating, or fast, speed (FIGS. 21 and 21A). Should the thickness of the stack of letters L presented to the final singulator 70 continue to increase, even though the motor 86 is running at its slow speed, then upon reaching a second, higher predetermined thickness of the stack of letters L, the motor 86 will be disconnected from its power supply and will stop (FIGS. 23, 23A). This stops the flow of letters L to the shingle former conveyor 40, and final singulator 70. Normal operation will resume when stack of letters L at output side of final singulator 70 is reduced to its normal thickness. The manner in which the mode of operation just described is obtained will now be described in detail, in connection with FIGURES 18, 18A to 23, 23A.

The flow limiter motor 86 (FIG. 3) is controlled by a two-speed starter with a fast speed contactor F, and a slow speed contactor S. Energizing contactor F connects the motor's fast speed winding to the motor power supply, and energizing contactor S connects the motor's slow speed winding to the motor power supply. Two speed motors of this type are standard, conventional devices, manufactured commercially by the General Electric Company, Shenectady, New York, and other concerns. The two speed starter has an F contactor controlled, normally closed interlock contact F–1 connected in series with the S contactor coil, and an S contactor controlled, normally closed interlock contact S–1 connected in series with the F contactor coil. This is an electrical interlock to prevent energizing both F and S contactor coils at the same time. A typical starter of this type is manufactured commercially by Cutler-Hammer, Inc. of Milwaukee, Wis., as their Model 9739–H–1394.

As shown in FIGURES 18, 19, 20, 21, 22 and 23, a normally open shingle former contact SF–1 must be closed before either the F or S flow limiter contactor coils can be energized. The contact SF–1 is controlled by a starter coil SF for the motor 150 (FIGS. 7 and 9), which drives the shingle former conveyor 40. The starter coil SF also controls, through an additional normally open contact SF–2, the upstream conveyors feeding letters to the flow limiter conveyor 20. The shingle former starter FS is controlled by a normally closed contact P5–1 of the photocell unit PC–5.

A selected series of operational conditions involving the functions of the circuit elements just described will now be explained. In FIGURE 18A, a single letter L, or a stack of letters having a combined thickness of less than one inch, is disposed between the helix 64 of the helical buffer B, and the belt 71 of the final singulator 70. Under these conditions, as seen in FIGURE 18A, all of the photocell units PC–3, PC–4 and PC–5 have their light beams eclipsed by the sleeve 342 of the helical buffer B. Thus all of the photocell relays P3, P4 and P5 associated with their respective photocell units are de-energized (FIG. 18).

When relay P5 is de-energized, the NC contact P5–1 is closed, and the contactor coil SF is energized, so that the shingle former motor 150 (FIG. 7) is running. Also, the normally open contact SF–1 is closed. With SF–1 closed, the fast speed contactor coil F for the flow limiter motor 86 can be connected across the line through either of two paths, or branches. One path is through a normally closed contact P3–1, and the other path is through a normally closed contact P4–1 in series with a normally open contact F–2. As contact P3–1 is closed due to the eclipse of photocell PC–3 beam by sleeve 342 of the helical buffer B, the fast contactor coil F is energized, and the motor 86 drives the flow limiter conveyor 20 at its fast speed. Upon energizing the fast contactor coil F a NO contact F–2 closes and establishes the second, or holding path through a normally closed contact P4–1, controlled by the photocell unit PC–4, which is eclipsed. The contactor coil F is now being held energized through both of the above mentioned paths.

A pair of normally open photocell contacts P3–2 and P4–2 are open, due to the eclipse of photocell units PC–3 and PC–4 by the sleeve 342 of the helical buffer B. Thus the slow contactor coil S for the motor 86 cannot be energized, under the conditions shown in FIGURES 18 and 18A. Since the fast contactor coil F is now energized, the NC contact F–1 is opened, and will present the slow contactor coil S from being energized until such time as the fast contactor coil F is de-energized, and the NC contact F–1 returns to its normally closed condition.

The energization of the contactor coil SF not only started the shingle former motor 150, as described above, it also closed a NO contact SF–2, which controls, through a contactor coil FL, the upstream conveyors feeding the flow limiter conveyor 20 (such as conveyor 10, FIG. 1), so that letters are fed into the flow limiter conveyor 20. Since details of the upstream conveyors are not critical to the present invention, the control for these portions of the overall system are not illustrated or described.

Under the condition just described, and as illustrated by FIGURES 18 and 18A, the flow limited conveyor 20 clears letters at its normal, or fast, rate and the stack of letters L presented to the final singulator conveyor 20 will normally increase in thickness. As this occurs, the helix 64 of the helical buffer conveyor B, will move to the right (as viewed in FIG. 18A), against the force of the spring 350. Since the helix 64 of the buffer conveyor B holds the stack of letters L against the final singulator conveyor belt 71 through the pressure of the spring 350, the helical buffer B will readily accommodate an increase in thickness of stack of letters L by the lateral movement of the buffer helix 64 on the shaft 336. Referring now to FIGURES 19 and 19A, if the thickness of letter L stack increases to a predetermined thickness, arbitrarily selected as being a stack 1″ thick in the system being described, as determined by the location of the photocell unit PC–3, the photocell unit PC–3 is cleared, that is, the beam is established between its light source and receiver due to the position of buffer sleeve 342. In this position of sleeve 342, the light beams of photocells PC–4 and PC–5 remain eclipsed.

The establishment or clearing of the beam of PC–3 indicates that the thickness of the stack L of letters is increasing, due to letters L being fed into helical buffer B from the shingle former conveyor 40, at a faster rate than they are being removed from the helical buffer B by the final singulator conveyor 70.

The only effect of the establishment of the beam of the photocell unit PC–3, as indicated in FIGURE 19A, is to open the normally closed contact P3–1, in one of the lines that energizes the fast coil F for the flow limiter motor 86. However, this opening of normally closed contact P3–1 by the re-establishment of photocell unit PC–3, has no effect at this time, because the fast motor coil F remains energized through the normally closed contact P4–1 (photocell unit PC–4 is eclipsed), and the holding contact F–2, which is normally open but which was closed up initial energization of the fast coil F. The normally closed contact P3–1 in the other circuit for the fast coil F, which intially energized the fast coil F as previously explained in connection with the circuit diagram of FIGURE 18, now opens, because the photocell unit PC–3 has been cleared. However, the fast coil F remains energized through contacts S–1, F–2, P4–1 and SF–1, as previously described.

FIGURES 20 and 20A show the conditions when a maixmum standard stack of letters L, which is arbitrarily selected in this case as being a stack 4″ thick, is presented to the final singulator conveyor 70. A stack of letters this thick retracts the helical buffer helix 64 and its mounting sleeve 342 sufficiently to clear the beam of photocell unit PC–4. As seen in FIGURE 20, this energizes the photocell relay coil P–4. The coil P–3 remains energized as before, because the photocell unit PC–3 remains cleared.

The effect of clearing the photocell PC–4, as in FIGURE 20, is to de-energize the fast coil F for the flow limiter motor 86, and energize the slow coil S for the motor. This condition occurs as follows:

The clearing of the photocell unit PC–4 energizes its relay coil P–4. This opens the normally closed contact P4–1 in one of the circuits for the fast motor coil F. The normally closed contact P3–1, in the other path for the fast coil F circuit was previously opened when PC–3 was cleared, as described in connection with FIGURE 19. Thus the prior opening of P3–1 (FIG. 19), and the present opening of P4–1 as just described, de-energizes the fast coil F. When the fast coil F is de-energized, the normally closed interlock contact F–1 in the circuit for the slow speed coil S closes.

Clearance of the photocell unit PC–4 also closes the normally open contact P4–2 in one of the circuits for the slow motor coil S. The previously closed, normally open contact SF–1 remains closed so long as the photocell unit PC–5 is eclipsed. Thus the closing of contact P4–2, as just described, energizes the slow speed motor coil S. In the other branch of the circuit for the slow speed coil S, once this coil is energized as explained above, the normally open holding contact S–2 is closed. In this same branch, the normally open contact P3–2 which was previously closed when photocell unit PC–3 was cleared, remains closed. Thus the slow speed coil S is now energized through both of its branch circuits.

Since the flow limiter motor 86 has now slowed down, the flow of letters to the helical buffer conveyor B will be decreased. The belt 71 of the final singulator conveyor 70 operates at constant speed, which means that under the present conditions, with the flow limiter motor 86 running at slow speed, the thickness of the stack of edged letters presented to the final singulator conveyor belt 71, which had reached a thickness of 4″, will normally be slowly reduced, as letters are removed from the helical buffer by the belt 71.

Referring to FIGURES 21 and 21A, this reduction in thickness of the edged stack of letters L presented to the final singulator conveyor belt 71, causes the helical buffer sleeve 342 to move to the left, as viewed in FIGURE 21A, under the force of the helical buffer spring 350. This motion of the sleeve 342 to the left, will soon re-eclipse the beam of the photocell unit PC–4, de-energizing the relay coil P–4 for that unit. The beam for the photocell unit PC–3 remains established, and its relay coil P–3 remains energized.

Upon de-energization of the photocell relay coil P–4, caused by the reduction in the thickness of the stack of letters, the normally closed contact P4–1, in one of the branch lines connected to the fast motor coil F, closes.

However, the normally open holding contact F–2 in the same branch remains open, as does the normally closed contact P3–1 in the other branch line (photocell unit PC–3 remains cleared). Thus the fast coil F remains de-energized despite the closing of normally closed contact P4–1, which was closed when the photocell unit PC–4 was re-eclipsed, as described above.

Also, the normally open contact P4–2 in one of the branch circuits for the slow coil S now opens, upon the re-eclipsing of the photocell unit PC–4, and the de-energization of its relay coil P–4, as just described. However, opening of the normally open contact P4–2 has no effect on the operation of the slow speed coil S. The slow speed coil S remains energized through the normally closed interlock contact F–1, the normally open holding contact S–2 (which was closed during the circuit conditions of FIGURES 20 and 20A as previously described, and remains closed under the conditions of FIGURES 21 and 21A), and the normally open contact P3–2, which was previously closed when the photocell unit P–3 was cleared (FIGS. 19 and 19A). The normally open contact SF–1 remains closed, because the photocell unit PC–5 remains eclipsed, its relay coil P–5 remains de-energized, and the normally closed contact P5–1 in the circuit of the starter coil SF remains closed. Thus the starter coil SF remains energized through the normally closed contact P5–1.

As long as the starter coil SF remains energized, the normally open contact SF–1 in the flow limiter motor speed control circuits remains closed, as previously described. Thus the flow limiter motor 86 continues to drive the flow limiter conveyor 20, at its slow speed. Usually the sleeve 342 of the helical buffer will continue to move to the left, as seen in FIGURE 21A, because normally slow coil S for the flow limiter conveyor motor 86 is energized, the final singulator conveyor belt 71 will remove letters from the stack L faster than they are added to the stack by the helical buffer conveyor B.

Referring to FIGURES 22 and 22A, continued operation of the flow limiter motor 86 at its slow speed, has resulted in a motion of the sleeve 342 of the helical buffer still farther to the left, and the thickness of the stack of letters L presented to the final singulator conveyor belt 71 decreases. This decrease in letter stack thickness takes place because the final singulator conveyor 70 is removing letters from the stack faster than they are being passed on by the flow limiter, when driven at its slow speed.

This leftward motion of the helical buffer sleeve 342 continues until the photocell unit PC–3 is eclipsed, as indicated in FIGURE 22A. The relay coil P–3 is now de-energized, opening the normally open contact P3–2 in one branch of the circuit of the slow speed motor coil S. The normally open contact P4–2 in the other branch of the slow speed circuit was opened when the photocell unit PC–4 was eclipsed (FIG. 21). Thus the slow speed coil S for the flow limiter motor 86 is de-energized.

At the same time, the fast speed coil F for the flow limiter motor 86 is energized, and this occurs in the following manner. When the slow speed coil S was de-energized as just described, the normally closed interlock contact S–1 in the circuit for the fast speed coil F, closes (FIG. 22). Eclipsing of photocell unit PC–3, and de-energization of its relay coil P–3, closes the normally closed contact P3–1 in one of the branch circuits of the fast coil F, and hence the coil F is energized, causing the flow limiter motor 86 to run at its higher speed. Energization of coil F closes the normally open holding contact F–2 in the other branch of the circuit for coil F. Since the beam of photocell unit PC–4 was previously eclipsed (FIG. 21A), the normally closed contact P4–1 in the same branch circuit of the fast coil F remains closed. Thus with PC–3 eclipsed, the fast coil F is energized, and the thickness of the stack of letters presented to the final singulator conveyor belt 71 increases. As this stack thickness increases, the helix 64 and the sleeve 342 of the helical buffer move to the right, and the beam of PC–3 is cleared. The coil P–3 is now re-energized, and the normally closed contact P3–1 in one of the branch circuits of the fast coil F opens again. However, this opening of contact P3–1 has no effect at this time, because the fast speed coil F remains energized through contacts P4–1, F–2, S–1 and SF–1.

With the flow limiter running at its faster speed, the thickness of the stack of letters can again be increased up to a 4″ stack thickness, and the photocell unit PC–4 may again be cleared. This establishes the conditions shown in FIGURES 20 and 20A, and de-energizes the fast coil F, while energizing the slow coil S for the flow limiter motor 86.

However, at times, even though the flow limiter motor 86 is running at its slower speed (FIGS. 20 and 20A), the rate of supply of letters to the helical buffer and to the final singulator belt 71 may be large enough to cause the thickness of the stack of letters at the final singulator conveyor belt 71 to increase further, reaching a thickness that is greater than the arbitrary thickness of 4″. If this condition continues long enough, the situation illustrated in FIGURES 23 and 23A will be developed.

As seen by the solid arrow in FIGURE 23A, the sleeve 342 of the helical buffer has continued to move to the right, until the thickness of the stack of letters L presented to the final singulator conveyor belt 71 reaches a thickness of 5″. This is the maximum acceptable thickness, and indicates that jamming conditions are imminent down the line. Thus when the 5″ maximum stack of letters L is accumulated at the final singulator conveyor 70, the sleeve 342 moves far enough to the right, as indicated in FIGURE 23A, to clear the beam of the photocell unit PC–5. Now the relay coil P–5 for the photocell unit PC–5 is energized for the first time. The relay coils P–3 and P–4 for the other photocell units remain energized, because the beams of photocell units PC–3 and PC–4 remain cleared.

With the relay coil P–5 energized as just described, the normally closed contact P5–1 in the circuit to the starter coil SF for the shingle former motor 150 opens. The shingle former conveyor 40 now stops running, and hence delivery of letters to the helical buffer B is interrupted.

De-energization of the starter coil SF for the shingle former motor 150, also opens the normally opened common contact SF–1 in the fast and slow circuits for the flow limiter conveyor motor 86. However, the normally open contact P3–2 in one of the branch circuits for the slow speed coil S, remains closed because the photocell unit PC–3 is cleared, and relay coil P–3 is energized. Likewise, the normally open contact P4–2 in the other branch circuit to the slow speed coil S, remains closed under the same conditions, because the photocell unit PC–4 has been cleared, energizing its relay coil P–4. Although the closing of contacts P3–2 and P4–2 as just described have no effect on the slow speed coil S at this time, their closing sets up the circuit for energizing the slow coils S, as soon as the letter stack thickness has been reduced to the desired maximum thickness of 5″ or less.

When the starter coil SF for the shingle former motor 150 was de-energized due to the clearance of photocell unit PC–5 (solid arrow of FIG. 23A), this de-energization of the coil SF opens a normally open contact SF–2 in the line of the starter motor coil FL for the motor (not shown) driving the upstream flow limiter feed conveyors, such as 10. The result of these conditions, illustrated in the circuit diagram of FIGURE 23, is to stop delivery of letters to the helical buffer conveyors B from all of the units in the system. Thus, the helical buffer can either be manually cleared, or if left alone the final singulator conveyor belt 71 will at once begin reducing the stack thickness of the letters presented thereto, from the maximum thickness of 5″.

Under these conditions the sleeve 342 of the helical buffer will begin moving to the left again, as indicated by the dashed arrow in FIGURE 23A. The sleeve 342 will first re-eclipse the beam of the photocell unit PC-5. This sets up the circuit conditions of FIGURE 20A, wherein PC-5 is eclipsed, and PC-3 and PC-4 are cleared. Under these conditions, the starter coil SF for the motor 150 that drives the shingle former motor 150 will be energized, restarting that motor. Also, re-energization of the starter coil SF, closes contact SF-2, and the starter coil FL, for the upstream flow limiter feed motor (not shown) conveyors, will be re-energized, restarting the motors for these conveyors. Finally, the contacts in the circuits for the fast and slow coils F and S, for the flow limiter motor 86, will be restored to the condition illustrated in FIGURE 20, with the slow coil S for the flow limiter conveyor motor 86 being energized.

Further motion of sleeve 342 to the left, as indicated by the dashed arrow in FIGURE 20A, eclipses PC-4, de-energizing the relay coil P-4, thereby setting up the conditions shown in FIGURE 19A, wherein PC-4 and PC-5 are eclipsed, but PC-3 is cleared. The sleeve 342 now moves to the right, as seen in FIGURE 19A, because the thickness of the stack of letters L is now increasing again. The operation steps, and cycles have now all been described in detail for all possible conditions, and the helical buffer conveyor B always presents a stack of letters L to the final singulator conveyor 70.

Review of the detailed description of the various elements in the system, will show that the system can continuously receive letters under random conditions, and continuously provide for a perfectly singulated stream of letters for presentation to a device such as a facer-canceller (not shown).

Having completed a detailed description of the invention so that those skilled in the art may practice the same, we claim:

1. A system for singulating a stream of edge supported flat articles such as letter mail, which stream is continuously introduced into the system as randomly formed patterns of the articles; said system comprising a horizontal plane transport conveyor for supporting the random patterns of mail on edge, a flow limiter conveyor in the path of said transport conveyor and having means for converting the random patterns of articles into a substantially continuous, relatively narrow stream of articles, a presingulator conveyor having means for longitudinally spreading out the stream of articles leaving said flow limiter conveyor, a presingulator feed conveyor belt for transporting the stream of articles from said flow limiter conveyor to said presingulator conveyor, a shingle former conveyor, a first accelerator conveyor for longitudinally spreading out the stream of articles received from said presingulator conveyor and delivering the articles to said shingle former conveyor, said shingle former conveyor having means for shifting the trailing portions of articles passing therethrough laterally away from adjacent downstream articles, a buffer conveyor, a buffer feeder conveyor having means for picking up articles leaving said shingle former conveyor, accelerating the articles, and delivering the articles to said buffer conveyor, said buffer conveyor having means for peeling off articles delivered by said buffer feeder conveyor and advancing the articles laterally as an edged stack of articles, a final singulator conveyor, having a stack peeling conveyor for individually picking off articles at the leading end of the stack of edged articles delivered by said buffer conveyor, a final accelerating conveyor for picking up articles from said final singulator conveyor and accelerating the articles so as to completely singulate them for presentation to a take away conveyor with gaps between adjacent articles, and means for driving said conveyors.

2. The system of claim 1, wherein said flow limiter conveyor comprises a horizontally running, vertically disposed article advancing belt, and a similarly disposed retrograde belt, said belts having closely spaced reaches for engaging the faces of articles that are edge supported on said transport belt, said conveyor driving means driving said article advancing belt at one speed and said retrograde belt in the opposite direction at a slower speed.

3. The system of claim 1, wherein said presingulator conveyor includes a horizontally running, vertical plane endless vacuum belt, a laterally extending restrainer having a nose portion disposed closely adjacent to the advancing reach of the vacuum belt, said conveyor driving means driving said presingulator conveyor vacuum belt at a linear speed higher than that of said presingulator feed conveyor belt.

4. The system of claim 1, wherein said first accelerator conveyor includes a horizontal plane, an accelerator belt that is inclined from the longitudinal axis of the system in a horizontal plane, and opposed vertical plane accelerator wheels; said shingle former conveyor comprising inner and outer vertical plane article gripping belts, said inner belt being inclined from the axis of the system in a direction opposite of the inclination of the accelerator belt of said first accelerator conveyor, said inner belt having a free portion that starts adjacent the delivery end of said accelerator conveyor belt, said outer belt of the shingle former conveyor having a free input reach portion that is substantially parallel to said accelerator conveyor belt, said free shingle former conveyor reach portions forming a divergent input throat for the shingle former.

5. The system of claim 4, wherein said conveyor driving means operates the inner and outer shingle former conveyor belts at a linear velocity substantially lower than that of said accelerator conveyor.

6. The system of claim 5, wherein said buffer feeder conveyor comprises a vertical plane, longitudinally running, apertured vacuum belt, and a cooperating vacuum box, said driving means driving said vacuum belt, at a linear speed that is substantially greater than that of said shingle former belts.

7. A system for singulating a stream of edge supported flat articles such as letter mail, which stream is continuously introduced into the system as randomly formed patterns of the articles; said system comprising a horizontal plane transport conveyor for supporting the random patterns of mail on edge, a flow limiter conveyor in the path of said transport conveyor and having means for converting the random patterns of articles into a substantially continuous, relatively narrow stream of articles, a presingulator conveyor having means for longitudinally spreading out the stream of articles leaving said flow limiter conveyor, a presingulator feed conveyor belt for transporting the stream of articles from said flow limiter conveyor to said presingulator conveyor, a shingle former conveyor, a first accelerator conveyor for further longitudinally spreading out the stream of articles received from said presingulator conveyor and delivering the articles to said shingle former conveyor, said shingle former conveyor having means for shifting the trailing portions of articles passing therethrough laterally away from adjacent downstream articles, a buffer conveyor, a buffer feeder conveyor having means for picking up articles leaving said shingle former conveyor, accelerating the articles, and delivering the articles to said buffer conveyor, said buffer conveyor having a helix for peeling off articles delivered by said buffer feeder conveyor and advancing the articles laterally, said buffer conveyor also including a laterally extending edger bar, and a generally longitudinally running horizontal plane edger conveyor, for urging the leading edges of the articles longitudinally against said edger bar and into said helix, while the articles are being advanced laterally by said helix, a final singulator conveyor, having a stack peeling conveyor for individually picking off articles at the leading end of the stack of edged articles formed by said buffer conveyor, a final accelerating conveyor for picking up articles from said final singulator conveyor and accelerating the articles so as to completely singulate them for presentation to a take away conveyor with gaps between adjacent articles, and means for driving said conveyors.

8. Apparatus for distributing flat, vertically disposed articles such as letters, in a straight line stream comprising a buffer conveyor in the form of a helix for advancing articles laterally of the stream, means mounting said helix for rotation about a substantially horizontal axis that is substantially normal to the letter stream with the helix being slidable along its axis, an article restrainer bar at said helix generally parallel to and downstream from the helix axis, a horizontal plane edger conveyor underlying said helix for advancing the articles laterally through said helix beneath its axis, and against said restrainer bar, a vertical plane feeder conveyor for advancing letters onto said horizontal plane conveyor on the laterally upstream side of said helix, a vertical plane letter removal conveyor facing the delivery end of said helix, resilient means for urging said helix to slide along its axis toward said letter removal conveyor, and means for rotating said helix and for driving said edger, feeder and letter removal conveyors.

9. Letter shingling apparatus comprising means for advancing letters on edge and in a stream, an accelerator belt for receiving said stream of letters and being inclined from the longitudinal axis of the stream in a horizontal plane, and a shingle former conveyor; said shingle former conveyor comprising inner and outer vertical plane article gripping belts, said inner belt having a straight advancing reach that is inclined from the axis of the stream in a direction opposite of the inclination of the accelerator belt, said outer belt having a free input reach portion that is substantially parallel to said accelerator conveyor belt for forming a divergent input throat for the shingle former conveyor.

10. The system of claim 3, wherein said restrainer is retractably mounted, remote control means for retracting the restrainer, article sensors disposed upstream and downstream of said restrainer, and control means connected to said sensors and said restrainer retracting means for retracting said restrainer when an article is sensed by said upstream sensor and no article is present at said downstream sensor.

11. The system of claim 1, wherein said buffer conveyor comprises a helix, means for rotating said helix about an axis generally normal to said stack peeling conveyor, means mounting said helix for reciprocation along its axis, means for sensing the axial position of said helix, and control means for controlling the delivery rate of conveyor means upstream of said buffer conveyor, said control means including means responsive to the axial position of said helix for maintaining the stack of articles formed in said helix at a predetermined normal minimum and maximum thickness.

12. Article stacking and singulating apparatus comprising delivery conveyor means including conveyor drive means, a buffer conveyor for receiving articles from said delivery conveyor means, and forming an edged stack of articles, and a stack peeling conveyor for individually peeling off articles from the leading end of the stack, said buffer conveyor comprising a helix, means for rotating said helix about an axis generally normal to said stack peeling conveyor, means mounting said helix for reciprocation along its axis, means for sensing the axial position of said helix, and control means for controlling the delivery rate of said delivery conveyor means, said control means including means responsive to the axial position of said helix for controlling the delivery rate of said delivery conveyor means, said control means maintaining the stack of articles formed in said helix at a predetermined normal minimum and maximum thickness.

13. The apparatus of claim 12, wherein the means for driving said delivery conveyor means includes a two speed motor, with said control means changing the motor speed for controlling the article stack thickness as defined in claim 12.

14. Apparatus for regulating the flow of a stream of flat articles, such as letters; comprising continuously running conveyor means, a retractably mounted article restrainer normally positioned close to said conveyor means, remote control means for retracting said restrainer, article sensors upstream and downstream from said restrainer, and control means including a time delay pulse signal generator connected to said sensors and said restrainer retracting means for cycling said restrainer when an article is sensed by said upstream sensor and no article is present at said downstream sensor.

References Cited
UNITED STATES PATENTS 3,039,592    6/1962    Fliegner _____ 198—165

FOREIGN PATENTS 565,035    11/1932    Germany.

OTHER REFERENCES

German printed application 1,015,821, September 1957.

EVON C. BLUNK, *Primary Examiner.*

RICHARD E. AEGERTER, *Examiner.*

UNITED STATES PATENT OFFICE
CERTIFICATE OF CORRECTION

Patent No. 3,347,348　　　　　　　　　　　　　October 17, 1967

Alan George Flint et al.

It is certified that error appears in the above identified patent and that said Letters Patent are hereby corrected as shown below:

Column 3, line 41, "10" should read -- 20 --.

Column 11, line 60, "singulator" should read -- singulation --.

Signed and sealed this 12th day of August 1969.

(SEAL)
Attest:

Edward M. Fletcher, Jr.　　　　　　　　　WILLIAM E. SCHUYLER, JR.
Attesting Officer　　　　　　　　　　　　　Commissioner of Patents